US012765680B2

(12) United States Patent
Masunaga et al.

(10) Patent No.: US 12,765,680 B2
(45) Date of Patent: Oct. 20, 2026

(54) LOAD-SUPPORTING STRUCTURE FOR CHAIR AND CHAIR

(71) Applicant: OKAMURA CORPORATION, Yokohama (JP)

(72) Inventors: Hiroshi Masunaga, Yokohama (JP); Syunsuke Ishimaru, Yokohama (JP); Syouichi Izawa, Yokohama (JP); Shinpei Totsuka, Yokohama (JP)

(73) Assignee: OKAMURA CORPORATION, Yokohama (JP)

(*) Notice: Subject to any disclaimer, the term of this patent is extended or adjusted under 35 U.S.C. 154(b) by 247 days.

(21) Appl. No.: 18/694,687

(22) PCT Filed: Mar. 7, 2022

(86) PCT No.: PCT/JP2022/009726
§ 371 (c)(1),
(2) Date: Mar. 22, 2024

(87) PCT Pub. No.: WO2023/047634
PCT Pub. Date: Mar. 30, 2023

(65) Prior Publication Data

US 2024/0389756 A1 Nov. 28, 2024

(30) Foreign Application Priority Data

Sep. 24, 2021 (JP) ................................ 2021-155717
Oct. 28, 2021 (JP) ................................ 2021-176588

(51) Int. Cl.
*A47C 7/44* (2006.01)
*A47C 7/02* (2006.01)
(Continued)

(52) U.S. Cl.
CPC .............. *A47C 7/445* (2013.01); *A47C 7/029* (2018.08); *A47C 7/14* (2013.01); *A47C 7/405* (2013.01); *B60N 2/503* (2013.01); *B60N 2/667* (2015.04)

(58) Field of Classification Search
CPC ........... A47C 7/405; A47C 7/455; A47C 7/46; A47C 7/462; A47C 7/48; A47C 7/029;
(Continued)

(56) References Cited

U.S. PATENT DOCUMENTS 4,047,757 A * 9/1977 Eames ................ A47C 7/0213
297/230.12
4,660,887 A * 4/1987 Fleming .................. A47C 7/44
297/448.2
(Continued)

FOREIGN PATENT DOCUMENTS

CN 101868168 A 10/2010
JP 48-013389 Y 4/1973
(Continued)

OTHER PUBLICATIONS

International Search Report for Application No. PCT/JP2022/009726, mailed May 17, 2022 (6 pages).
Japanese Office Action in Japanese Application No. 2021-176588 mailed Sep. 2, 2025 with English Translation (7 pages).

*Primary Examiner* — Syed A Islam
(74) *Attorney, Agent, or Firm* — NIXON PEABODY LLP; Jeffrey L. Costellia

(57) ABSTRACT

A load-supporting structure for a chair includes a receiving surface component provided with a curved receiving surface configured to receive a load from a seated person; a load supporter supporting the receiving surface component from a back side of the receiving surface; and a curved shape-changing portion configured to change a curvature radius of the receiving surface from a curvature radius in an initial
(Continued)

state thereof to a greater curvature radius than that in the initial state in accordance with a load received by the receiving surface component. The receiving surface component generates a biasing force for returning the curvature radius of the receiving surface to that in the initial state.

9 Claims, 15 Drawing Sheets

(51) Int. Cl.

| | |
|---|---|
| *A47C 7/14* | (2006.01) |
| *A47C 7/40* | (2006.01) |
| *B60N 2/50* | (2006.01) |
| *B60N 2/66* | (2006.01) |

(58) Field of Classification Search

CPC .......... A47C 7/14; B60N 2/667; B60N 2/503; B60N 2/686

See application file for complete search history.

(56) References Cited

U.S. PATENT DOCUMENTS

| | | | | |
|---|---|---|---|---|
| 7,658,448 | B2 * | 2/2010 | Birk | A61G 5/107 297/452.4 |
| 7,896,438 | B2 * | 3/2011 | Whelan | A47C 7/462 297/284.4 |
| 8,991,932 | B2 | 3/2015 | Okuda et al. | |
| 9,186,290 | B2 * | 11/2015 | Fowler | A61G 5/1043 |
| 9,585,484 | B1 * | 3/2017 | Tsai | A47C 7/40 |
| 11,413,181 | B2 * | 8/2022 | Desvaux De Marigny | A61G 5/122 |

FOREIGN PATENT DOCUMENTS

| | | | |
|---|---|---|---|
| JP | 2005-152087 | A | 6/2005 |
| JP | 2006-218047 | A | 8/2006 |
| JP | 2011-101762 | A | 5/2011 |
| JP | 2013-052767 | A | 3/2013 |
| JP | 6465525 | B2 | 2/2019 |
| JP | 2020-039465 | A | 3/2020 |

* cited by examiner

LOAD-SUPPORTING STRUCTURE FOR CHAIR AND CHAIR

CROSS-REFERENCE TO RELATED APPLICATIONS

This application is a U.S. National Phase Application of a PCT Application No. PCT/JP2022/009726 filed on Mar. 7, 2022, which claims priority to Japanese Patent Application No. 2021-155717, filed on Sep. 24, 2021, and Japanese Patent Application No. 2021-176588, filed on Oct. 28, 2021, the content of which are hereby incorporated by reference.

TECHNICAL FIELD

The present invention relates to a load-supporting structure for a chair and a chair.

BACKGROUND ART

Patent Document 1 below discloses a chair that can largely change a curved shape of a backrest (i.e., a load-supporting structure) and limit a decrease in a force for supporting a seated person. This chair includes the backrest provided with a receiving surface component that comes into contact with a seated person and that receives a load, a backrest-supporting member (i.e., a load supporter) supporting the backrest from the back, and a curved shape-changing portion configured to change a curved shape of the receiving surface component. The curved shape-changing portion includes an operation member that is movably supported by either one of the backrest or the backrest-supporting member. The operation member includes a base end portion that is rotatably supported by the one of the backrest or the backrest-supporting member, and a tip end portion that rotates around the base end portion and that pushes the other of the backrest or the backrest-supporting member.

DOCUMENT OF RELATED ART

Patent Document

[Patent Document 1] Japanese Patent No. 6465525

SUMMARY OF INVENTION

Problems to be Solved by Invention

In the above-described chair, the curved shape of the receiving surface component of the backrest can be changed by the operation member pushing both end portions of the backrest in the width direction. However, a manual operation for the operation member is required, so that it may take time and effort to adjust it. In addition, in order to accept seated persons having various physiques, it is necessary to enable the position of the operation member to be adjusted in multiple stages, which may cause a complicated structure.

The present invention was made in view of the above circumstances, and an object thereof is to provide a load-supporting structure for a chair and a chair that can appropriately change a curved shape of a receiving surface component in accordance with seated persons having various physiques without a manual operation.

Means for Solving Problems

In order to solve the above problems, the present invention adopts the following aspects.

A load-supporting structure for a chair according to an aspect of the present invention includes a receiving surface component provided with a curved receiving surface configured to receive a load from a seated person; a load supporter supporting the receiving surface component from a back side of the receiving surface; and a curved shape-changing portion configured to change a curvature radius of the receiving surface from a curvature radius in an initial state thereof to a greater curvature radius than that in the initial state in accordance with a load received by the receiving surface component. The receiving surface component generates a biasing force for returning the curvature radius of the receiving surface to that in the initial state.

According to the above aspect, the curvature radius of the receiving surface of the receiving surface component that receives a load from a seated person is set to be small in the initial state, and the curved shape thereof is changed from being small to be large in accordance with a load received by the receiving surface component. As a result, it is possible to give a feeling of fitting to seated persons having various physiques, including seated persons having physiques from a small physique to a large physique. Further, when the load on the receiving surface component is released, it is possible to return the curvature radius of the receiving surface to that in the initial state by the biasing force generated by the receiving surface component. Thus, it is possible to appropriately change the curved shape of the receiving surface component in accordance with seated persons having various physiques without a manual operation.

In the load-supporting structure for a chair according to the above aspect, the curved shape-changing portion may be configured of free end portions on both sides of the receiving surface component in a width direction, the free end portions being not supported by the load supporter, and a supported portion of the receiving surface component supported by the load supporter on an inner side of the free end portions in the width direction.

In this case, both end portions of the receiving surface component in the width direction are set to be the free end portions that are not fixed to the load supporter, the free end portions are displaced by using the supported portion on an inner side of the receiving surface component in the width direction as a fulcrum, and the free end portions are biased toward the initial state thereof by the biasing force generated by the receiving surface component, whereby a cancelling state is created between the biasing force and the load received from the seated person, and it is possible to form curved shapes that can give a feeling of fitting to seated persons having various physiques.

In the load-supporting structure for a chair according to the above aspect, the supported portion may include two supported portions provided to be spaced apart from each other in the width direction.

In this case, the supported portion of the receiving surface component is divided into two portions spaced apart from each other in the width direction, whereby it becomes easy to individually elastically deform regions on the outer sides and the inner sides of the two supported portions in the width direction, and the followability to the physique of the seated person is improved.

In the load-supporting structure for a chair according to the above aspect, the load supporter may include two support portions supporting the two supported portions, and a leaf spring portion connecting the two support portions and configured to push a position between the two supported portions from the load supporter side to the receiving surface component side in accordance with the load received by the receiving surface component.

In this case, when the free end portions on the outer sides of the two supported portions in the width direction are elastically displaced toward the back side of the receiving surface, a region on the inner side of the two supported portions in the width direction is elastically displaced toward the front side of the receiving surface by the leaf spring portion pushing, so that it is possible to largely change the curved shape of the receiving surface component even though the displacement amount of the free end portions is small.

In addition, the leaf spring portion may use a restoring force thereof for returning from an elastic deformed state when the receiving surface component receives a load to an initial state, in addition to the biasing force of the receiving surface component, as a biasing force for returning the curvature radius of the receiving surface to that in the initial state.

In this case, it is possible to increase the biasing force for returning the curvature radius of the receiving surface to that in the initial state.

In the load-supporting structure for a chair according to the above aspect, the receiving surface component may form a backrest plate.

In this case, a backrest is obtained that can give an appropriate feeling of fitting to seated persons having various physiques.

In the load-supporting structure for a chair according to the above aspect, the backrest plate may include a frame portion forming an external shape of the backrest plate, and a plurality of strip-shaped portions separated through a slit inside the frame portion.

In this case, the inside of the frame portion that forms the external shape of the backrest plate is separated into the plurality of strip-shaped portions through the slit, whereby it becomes easy to individually elastically deform portions inside the frame portion by the plurality of strip-shaped portions, and the followability to the physique of the seated person is improved.

In the load-supporting structure for a chair according to the above aspect, the plurality of strip-shaped portions may include two strip-shaped portions that are separated right and left through the slit at a central portion of the backrest plate in a width direction, and an inner end portion of each of the two strip-shaped portions in the width direction may be supported by the load supporter at the central portion of the backrest plate in the width direction.

In this case, since the right and left two strip-shaped portions can be individually elastically deformed by the separation of the backrest plate at the central portion thereof in the width direction, it becomes easy to change the curved shape of the receiving surface of the backrest plate starting from the central portion in the width direction, and the followability to the physique of the seated person is improved.

In the load-supporting structure for a chair according to the above aspect, the inner end portion of each of the two strip-shaped portions in the width direction may include a rotating shaft that is rotatably supported by the load supporter on an axis extending in an up-down direction.

In this case, when a load is applied from the seated person to portions of the frame portion on the outer sides of the right and left two strip-shaped portions in the width direction, each of the two strip-shaped portions rotates around the rotating shaft provided in the inner end portion thereof in the width direction and extending in the up-down direction, and thus the backrest plate is easily deformed forward and rearward in conjunction with the load input to the frame portion.

In the load-supporting structure for a chair according to the above aspect, the receiving surface component may form a seat plate.

In this case, a seat is obtained that can give an appropriate feeling of fitting to seated persons having various physiques.

In the load-supporting structure for a chair according to the above aspect, the seat plate may include two mesh plate portions formed to be spaced apart from each other in a width direction.

In this case, it becomes easy to individually elastically deform regions on the outer sides and the inner sides of the two mesh plate portions in the width direction, and the followability to the physique of the seated person is improved.

A chair according to another aspect of the present invention includes the load-supporting structure according to the above aspects.

In this case, a chair is obtained that can give an appropriate feeling of fitting to seated persons having various physiques.

Effects of Invention

According to each of the above aspects, it is possible to obtain a load-supporting structure for a chair and a chair that can appropriately change a curved shape of a receiving surface component in accordance with seated persons having various physiques without a manual operation.

EMBODIMENTS OF INVENTION

Figure 1:
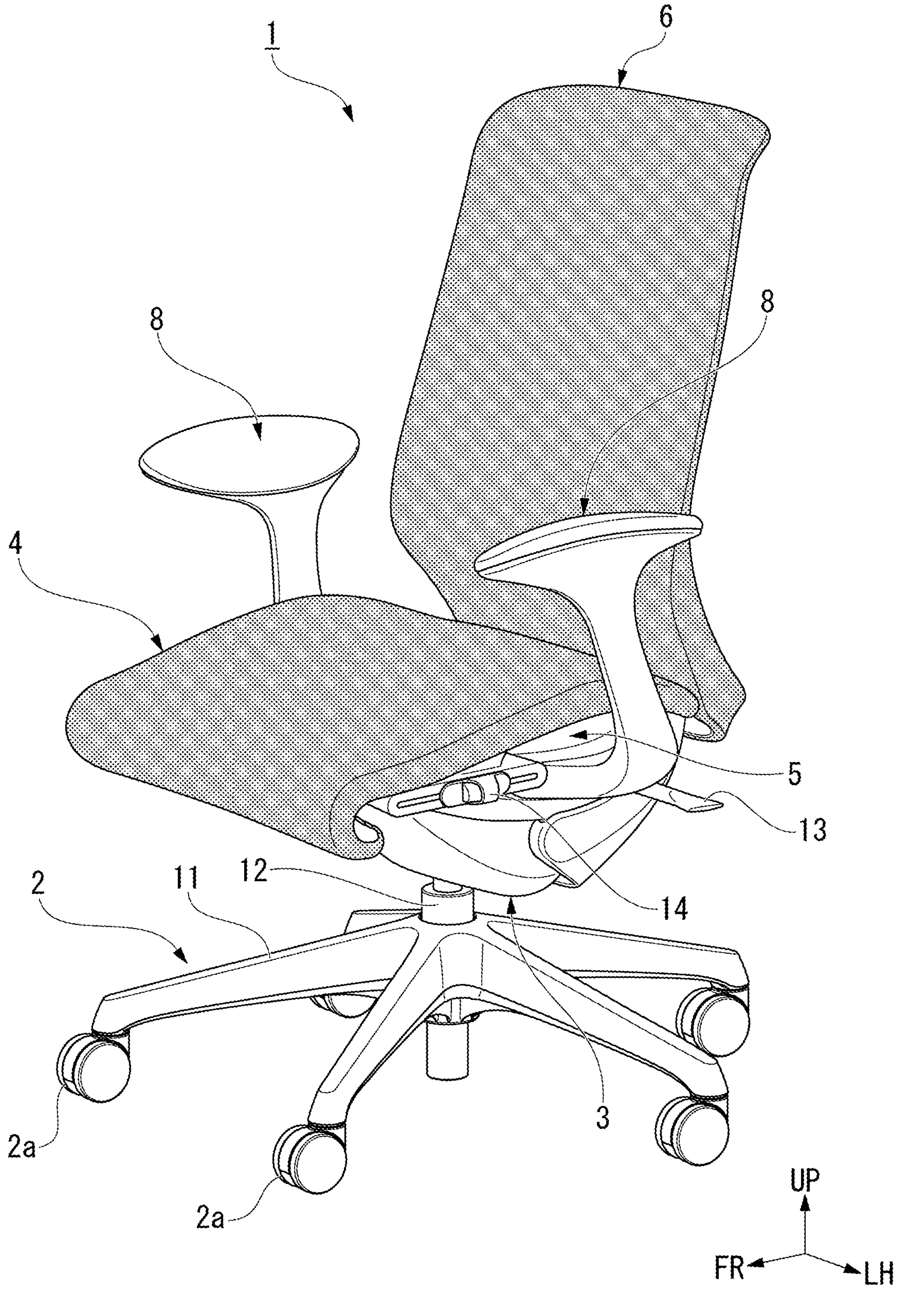
FIG. 1 is a perspective view of a chair according to a first embodiment when viewed from a front side.

Hereinafter, embodiments of the present invention will be described below with reference to the drawings. Note that, in the following description, a direction, which is indicated by the arrow FR in the drawings in which the front of a person who sits on a chair at a normal posture is directed, will be referred to as a "front", and a direction opposite thereto will be referred to as a "rear". In addition, regarding "up", "down", "left", and "right", a direction indicated by the arrow UP in the drawing on the upper side of the person who sits on the chair at the normal posture is referred to as "up", and a direction opposite thereto is referred to as "down". A direction indicated by the arrow LH in the drawing on the left side of the person who sits on the chair at the normal posture is referred to as "left", and a direction opposite thereto is referred to as "right". Note that, in the following description, as an example, a case will be described in which a width direction of a load-supporting structure for a chair coincides with a right-left direction.

First Embodiment

FIG. 1 is a perspective view of a chair 1 according to a first embodiment when viewed from a front side.

As shown in FIG. 1, a chair 1 in the present embodiment includes a leg portion 2 placed on a floor, a box-shaped support base 3 installed at an upper end of the leg portion 2, a seat body 4 on which a seated person sits, a seat-receiving member 5 that supports the seat body 4 attached to an upper surface of the support base 3, a backrest 6 that supports a back of the seated person who sits on the seat body 4, a backrest-supporting member 7 (see FIG. 2 which will be described later) that supports the backrest 6 from a rear, and an armrest 8 that supports an elbow of the seated person who sits on the seat body 4.

The leg portion 2 includes manifold leg 11 with a caster 2*a* and a pedestal 12 with, for example, a built-in gas spring that stands up from a central portion of the manifold legs 11 and is a lifting mechanism. The support base 3 is rotatably attached to an upper end portion of the pedestal 12 in a horizontal direction (around an axis extending in an up-down direction). A lifting adjustment mechanism (not represented) of the pedestal 12 and an inclination adjustment mechanism (not represented) of the backrest-supporting member 7 are built in the support base 3. Note that the reference sign 13 denotes an operation knob of the inclination adjustment mechanism which protrudes on a side surface of the support base 3. In addition, the reference sign 14 denotes a slider that extends, forward, a front end portion of the seat body 4 in a bent state by changing a bending position thereof.

[Load-Supporting Structure of Backrest]

Figure 2:
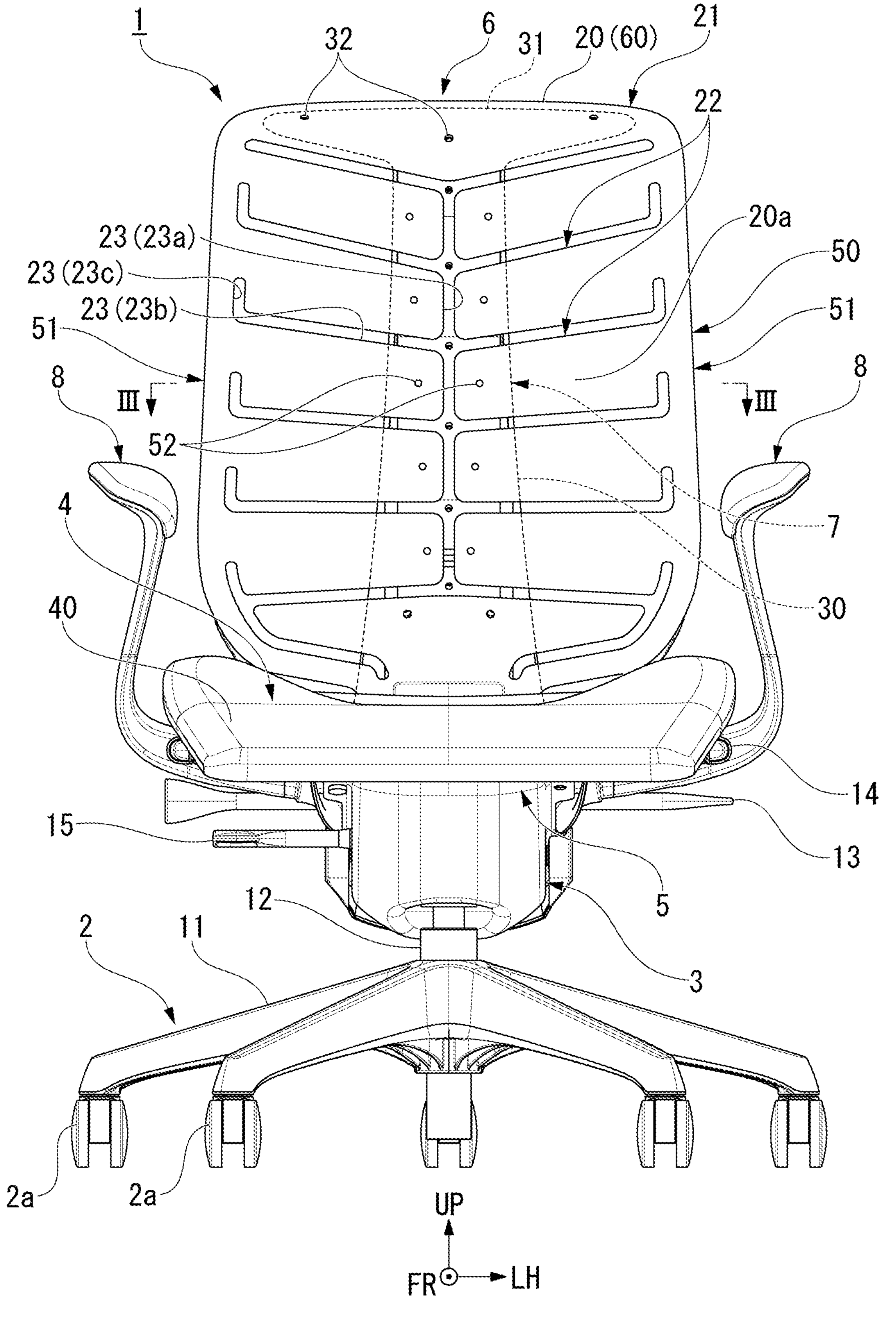
FIG. 2 is a front view of the chair according to the first embodiment.
Figure 3:
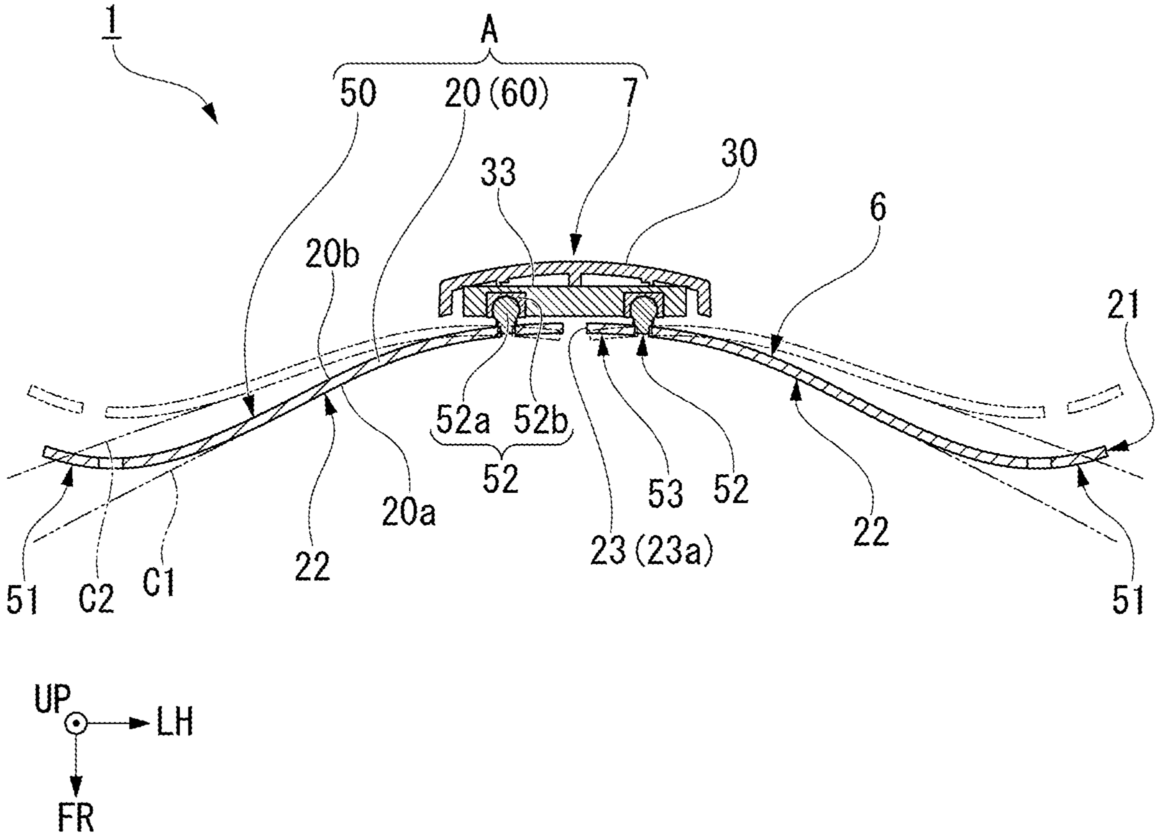
FIG. 3 is a cross-sectional view taken along line III-III shown in FIG. 2.

FIG. 2 is a front view of the chair 1 according to the first embodiment. Note that, in FIG. 2 and thereafter, in order to improve visibility of main portions of the seat body 4 and the backrest 6, a cushioning material and a seat skin material, which cover surfaces of a seat plate 40 and a backrest plate 20, are removed. FIG. 3 is a cross-sectional view taken along line III-III shown in FIG. 2.

As shown in FIG. 2, the backrest 6 includes the backrest plate 20 (receiving surface component that is molded with resin and forms the skeleton of the backrest 6. Note that the reference sign 15 shown in FIG. 2 denotes an operation lever of the lifting adjustment mechanism in the support base 3.

The backrest plate 20 has a substantially rectangular shape with four rounded corners in the front view shown in FIG. 2. The backrest plate 20 includes a frame portion 21 that forms an external shape of the backrest plate 20 and a plurality of strip-shaped portions 22 separated through a slit 23 on the inside of the frame portion 21. The slit 23 that separates the strip-shaped portion 22 includes a first slit 23*a*, a second slit 23*b*, and a third slit 23*c*.

The first slit 23*a* extends in the up-down direction at an intermediate position of the backrest plate 20 in the right-left direction. The first slit 23*a* is a slit that separates the right and left strip-shaped portions 22 on the inside of the frame portion 21. The second slit 23*b* is a slit that extends from the first slit 23*a* to both left and right sides and performs separation into the upper and lower strip-shaped portions 22. A plurality of the second slits 23*b* are formed at intervals in the up-down direction. As a result, a plurality of pairs of right and left strip-shaped portions 22 are formed in the up-down direction on the inside of the frame portion 21.

An angle of the second slit 23*b* with respect to the horizontal plane is not uniform. When the second slit 23*b* that is the second from the lower side is set as a reference (0 degrees), the second slit 23*b* located above the reference has a positive-side angle in which an outer end portion in the right-left direction is higher than an inner end portion, and conversely, the second slit 23*b* located below the reference has a negative-side angle in which the outer end portion in the right-left direction is lower than the inner end portion. In addition, an angle of the second slit 23*b* located above the reference with respect to the horizontal plane is increased to the positive side as the second slit 23*b* extends upward.

The third slit 23*c* extends from an outer end portion of the second slit 23*b* in the right-left direction in a direction intersecting the second slit 23*b*, and forms a boundary between the frame portion 21 and the strip-shaped portion 22. The third slit 23*c* is bent in an L-shape with respect to the second slit 23*b*. The width of a connection portion between the frame portion 21 and the strip-shaped portion 22 in the up-down direction is narrower than the width of the strip-shaped portion 22 in the up-down direction. As a result, it is easy to individually elastically deform each of the strip-shaped portions 22 with respect to the frame portion 21, and the followability to the physique of the seated person is improved.

As shown in FIG. 3, the backrest plate 20 having the above configuration has a receiving surface 20*a* that is curved and receives a load from the seated person. The receiving surface 20*a* has a curved shape that protrudes rearward in a plan view. The backrest-supporting member 7 supports the backrest plate 20 from a back side of the receiving surface 20*a*. The backrest-supporting member 7 is a strength member capable of supporting the load of the backrest plate 20 and the seated person. As shown in FIG. 2, the backrest-supporting member 7 includes a first support portion 30 that extends in the up-down direction and supports a central portion of the backrest plate 20 in the right-left direction, and a second support portion 31 that extends from an upper end portion of the first support portion 30 to both sides in the right-left direction, and supports an upper end portion of the backrest plate 20.

A lower end portion of the first support portion 30 has a substantially L shape in a side view, and the lower-end front portion thereof is joined to the inclination adjustment mechanism in the support base 3. The first support portion 30 is formed in a columnar shape extending in the up-down direction, and supports an inner end portion of the strip-shaped portion 22 of the backrest plate 20 in the right-left direction through a supported portion 52 (which will be described later). The second support portion 31 is formed in a plate shape extending in the right-left direction, and fixes one side of the upper end of the frame portion 21 of the backrest plate 20, which extends in the right-left direction, at a plurality of portions through fixing members 32 such as bolts.

As shown in FIG. 3, the backrest plate 20 includes free end portions 51 on both sides in the right-left direction, which are not supported by the backrest-supporting member 7, and the supported portion 52 that is supported by the backrest-supporting member 7 on the inner side of the free end portion 51 in the right-left direction. The free end portion 51 and the supported portion 52 constitute a curved shape-changing portion 50 that changes a curvature radius of the receiving surface 20*a* from a curvature radius (shape C1) in an initial state (state where the load of the seated person is not applied) to a relatively large curvature radius (shape C2), in accordance with a load received by the backrest plate 20.

The free end portion 51 is formed by portions of the frame portion 21 on both sides in the right-left direction, and outer end portions of the left and right strip-shaped portions 22 in the right-left direction. The supported portion 52 is formed by inner end portions of the left and right strip-shaped portions 22 supported by the backrest-supporting member 7 in the right-left direction. Two the supported portions 52 are provided to be spaced apart from each other in the right-left direction. The supported portion 52 is formed by a ball stud 52*a* attached to a back surface 20*b* of the backrest plate 20 and a socket 52*b* that spherically receives the ball stud 52*a*. The socket 52*b* is attached to an attachment plate 33 fixed to the front side of the first support portion 30 of the backrest-supporting member 7.

Next, the shape change of the backrest 6 having the above configuration by the load-supporting structure will be described.

When a seated person applies a load to the backrest 6, the outer free end portion 51 in the right-left direction of the backrest plate 20, which is not fixed to the backrest-supporting member 7, is elastically displaced rearward with the supported portion 52 on the inner side of the backrest plate 20 in the right-left direction as a fulcrum, in accordance with the load. When the free end portion 51 of the backrest plate 20 is elastically displaced rearward, the curvature radius of the receiving surface 20*a* is changed from the curvature radius (shape C1) in the initial state to the relatively large curvature radius (shape C2).

In other words, when the seated person leans on the backrest 6, the back of the seated person having a relatively large transverse width of the body comes into contact with the free end portion 51, and the back of the seated person having a relatively small transverse width of the body comes into contact with a position on an inner side of the free end portion 51 in the right-left direction. When a load is further applied in this state, a force is applied to the free end portion 51 or the above-described position, and thus the backrest plate 20 is curved such that the curvature radius of the receiving surface 20*a* increases with the supported portion 52 as the fulcrum. When the seated person further applies a load, finally, any of the free end portion 51 or the above position and the supported portion 52 come into contact with the back of the seated person, and the back of the seated person is supported within a wide range of the receiving surface 20*a*.

Specifically, the portion to be actually pressed on the free end portion 51 differs in the right-left direction depending on the physique (the width of the back) of the seated person. As a result, a rearward pressing amount of the free end portion 51 in the front-rear direction changes. That is, since the supported portion 52 serves as a fulcrum of elastic displacement of the free end portion 51, the larger a distance from the supported portion 52 in the right-left direction to the portion, the larger the rearward displacement amount in the front-rear direction. Here, the free end portion 51 that has been elastically displaced rearward tries to return to the initial state before the elastic displacement by a restoring force of the backrest plate 20 itself. This becomes biasing means 60. The free end portion 51 tries to return to the initial state, thereby creating an offset state between the load received from the seated person and a biasing force of the biasing means 60, and it is possible to form a curved shape capable of giving a feeling of fitting to seated persons having various physiques.

That is, the backrest plate 20 generates a biasing force for returning the curvature radius of the receiving surface 20*a* to the initial state. In other words, the backrest plate 20 can use the restoring force when the state where the backrest plate 20 receives the load of the seated person and is elastically deformed returns to the initial state, for returning the curvature radius of the receiving surface 20*a* to the initial state.

In addition, since two supported portions 52 are provided to be spaced apart from each other in the right-left direction, it is easy to individually elastically deform the regions on the outer side in the right-left direction and the inner side in the right-left direction with respect to two supported portions 52. Further, since the strip-shaped portions 22 are separated to the right portion and the left portion by the slit 23 (first slit 23*a*), when the free end portion 51 is displaced toward the rear side (rear) of the receiving surface 20*a*, a region (referred to as an inter-support portion 53) between two supported portions 52 is displaced toward the front side (front) of the receiving surface 20*a*, and thus it is possible to largely change the curved shape as the entirety of the backrest plate 20 even though the displacement amount of the free end portion 51 is small.

As described above, the load-supporting structure (the load-supporting structure for the chair) of the backrest 6 according to the present embodiment includes the backrest plate 20 (receiving surface component) having the curved receiving surface 20*a* that receives a load from a seated person, the backrest-supporting member 7 (load supporter) that supports the backrest plate 20 from the back side of the receiving surface 20*a*, the curved shape-changing portion 50 that changes the curvature radius of the receiving surface 20*a* from the curvature radius (shape C1) in the initial state to a relatively large curvature radius (shape C2) in accordance with the load received by the backrest plate 20, and the biasing means 60 (backrest plate 20) that returns the curvature radius of the receiving surface 20*a* to the initial state.

In other words, the load-supporting structure A for the chair 1 includes the backrest plate 20 having the receiving surface 20*a* that is curved and receives a load from a seated person, the backrest-supporting member 7 that supports the backrest plate 20 from the back side of the receiving surface 20*a*, and the curved shape-changing portion 50 that changes the curvature radius of the receiving surface 20*a* to a curvature radius larger than the curvature radius in the initial state in accordance with the load received by the backrest plate 20. The backrest plate 20 is configured to generate a biasing force for returning the curvature radius of the receiving surface 20*a* to the initial state.

According to this configuration, the curvature radius of the receiving surface 20*a* of the backrest plate 20 that receives a load from a seated person is set to be small in the initial state, and the curved shape is changed from being small to be large in accordance with the load received by the backrest plate 20. As a result, it is possible to give a feeling of fitting to seated persons of various physiques, including seated persons having physiques from a small physique to a large physique. In addition, when the load on the backrest plate 20 is released, the curvature radius of the receiving surface 20*a* can be returned to the initial state by the biasing means 60 (in other words, the restoring force of the backrest plate 20). Thus, it is possible to appropriately change the curved shape of the backrest plate 20 without a manual operation, in accordance with seated persons having various physiques.

Further, the above-described chair in the related art has a configuration in which the curved shape of the receiving surface component of the backrest is changed from the initial state in which the curvature radius is large to a state in which the curvature radius is small. Thus, for example, it is difficult to change the curvature radius to a value equal to or larger than the initial state, and particularly it is difficult to give an appropriate feeling of fitting to a seated person having a large physique. However, according to the above configuration, it is possible to also give an appropriate feeling of fitting to a seated person having a large physique.

In addition, in the present embodiment, the curved shape-changing portion 50 includes the free end portions 51 of the backrest plate 20 on both sides in the right-left direction, which are not supported by the backrest-supporting member 7, and the supported portion 52 of the backrest plate 20, which is supported by the backrest-supporting member 7, on the inner side of the free end portions 51 in the right-left direction. According to this configuration, the end portions of the backrest plate 20 on both sides in the right-left direction are set as the free end portions 51 that are not fixed to the backrest-supporting member 7, and the free end portions 51 are displaced with the supported portion 52 as a fulcrum on the inner side of the backrest plate 20 in the right-left direction, whereby the biasing means 60 biases the backrest plate 20 toward the initial state. Thus, the offset state between the load received from the seated person and the biasing force of the biasing means 60 is created, and thus it is possible to form a curved shape capable of giving a feeling of fitting to the seated persons having various physiques.

In addition, in the present embodiment, two the supported portions 52 are provided to be spaced apart from each other in the right-left direction. According to this configuration, the supported portion 52 of the backrest plate 20 is divided into two pieces to be spaced apart from each other in the right-left direction. Thus, it is easy to individually elastically deform the regions on the outer side in the right-left direction and the inner region in the right-left direction with respect to two supported portions 52, and thus the followability to the physique of the seated person is improved. In addition, according to this configuration, when the outer free end portions 51 of two supported portions 52 in the right-left direction are elastically displaced toward the rear side of the receiving surface 20*a*, the inner region (inter-support portion 53) of two supported portions 52 in the right-left direction is elastically displaced toward the front side of the receiving surface 20*a*. Thus, it is possible to largely change the curved shape of the backrest plate 20 even though the displacement amount of the free end portion 51 is small.

Further, in the present embodiment, the backrest plate 20 forms the backrest 6. According to this configuration, the backrest 6 capable of giving the appropriate feeling of fitting to seated persons having various physiques can be obtained.

Further, in the present embodiment, the backrest plate 20 includes a frame portion 21 that forms an external shape of the backrest plate 20 and a plurality of strip-shaped portions 22 separated through a slit 23 on the inside of the frame portion 21. According to this configuration, since the inside of the frame portion 21 that forms the external shape of the backrest plate 20 is separated into the plurality of strip-shaped portions 22 through the slit 23, it is easy to individually elastically deform the inside of the frame portion 21 by the plurality of strip-shaped portions 22, and thus the followability to the physique of the seated person is improved.

In addition, in the present embodiment, the plurality of strip-shaped portions 22 include two strip-shaped portions 22 separated to the right portion and the left portion through the slit 23 (first slit 23*a*) at the central portion of the backrest plate 20 in the width direction, and the inner end portion of each of two strip-shaped portions 22 in the width direction is supported by the backrest-supporting member 7 at the central portion of the backrest plate 20 in the width direction. According to this configuration, since two right and left strip-shaped portions 22 can be individually and elastically deformed by the separation at the central portion of the backrest plate 20 in the width direction, it is easy to change the curved shape of the receiving surface of the backrest plate 20 starting from the central portion in the width direction, and the followability to the physique of the seated person is improved.

Since the chair 1 according to the present embodiment includes the load-supporting structure of the backrest 6, it is possible to give an appropriate feeling of fitting to seated persons of various physiques.

As described above, according to the present embodiment, it is possible to appropriately change the curved shape of the backrest 6 without a manual operation, in accordance with seated persons having various physiques.

Figure 4:
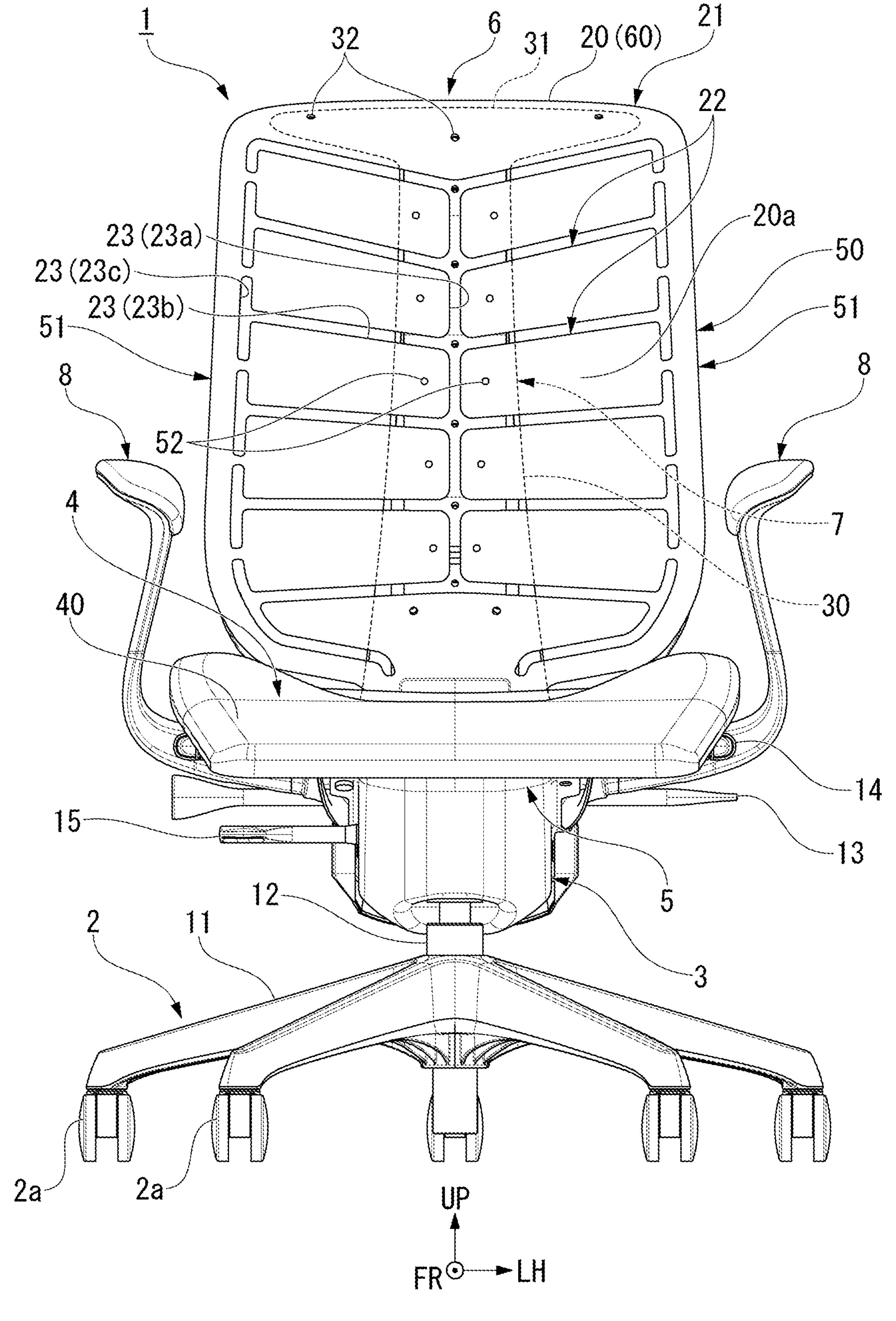
FIG. 4 is a front view of a chair according to a modification of the first embodiment.

Note that the above-described load-supporting structure of the backrest 6 may have a configuration as shown in FIG. 4.

FIG. 4 is a front view of a chair 1 according to a modification of the first embodiment.

In the backrest plate 20 shown in FIG. 4, the third slit 23*c* is formed in a T-shape that extends to both sides in the up-down direction with respect to the second slit 23*b*, and the width of the connection portion in the up-down direction between the frame portion 21 and the strip-shaped portion 22 is set to be narrower than the width of the strip-shaped portion 22 in the up-down direction. Even in this configuration, as in the above embodiment, it is easy to individually elastically deform each strip-shaped portion 22 with respect to the frame portion 21, and the followability to the physique of the seated person is improved.

[Load-Supporting Structure of Seat Body]

Figure 5:
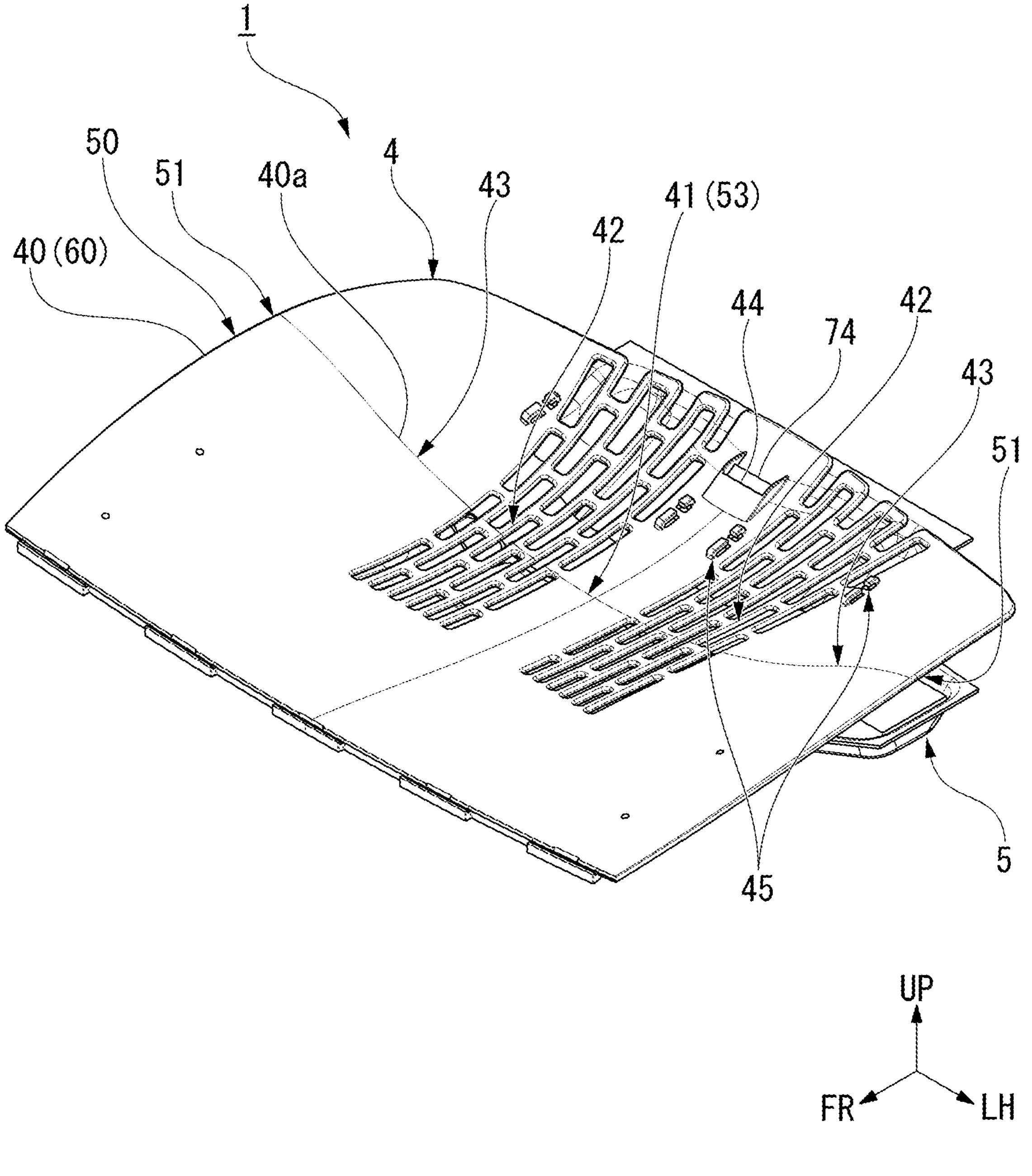
FIG. 5 is a perspective view of a seat body and a seat-receiving member according to the first embodiment.
Figure 6:
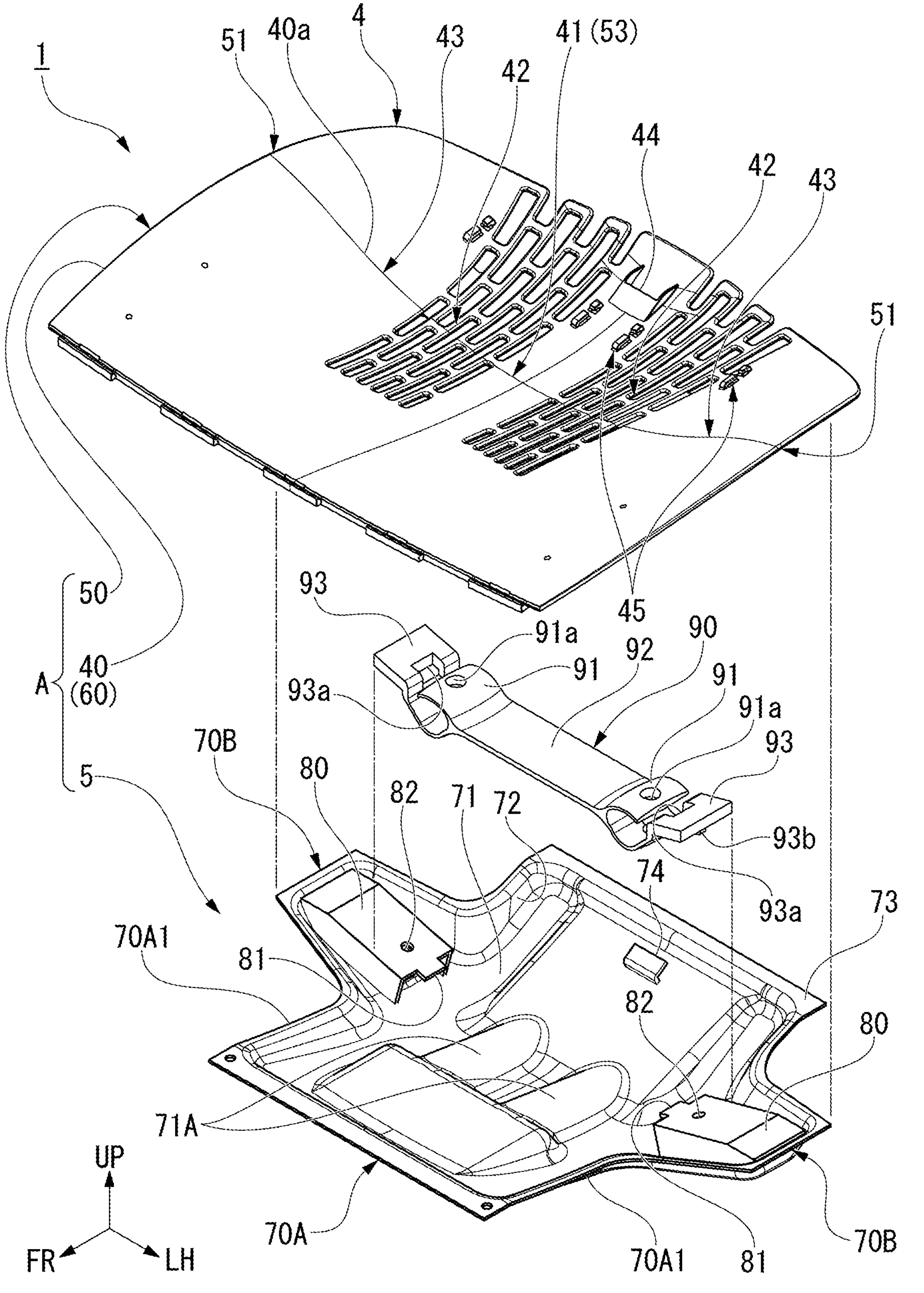
FIG. 6 is an exploded perspective view of the seat body and the seat-receiving member according to the first embodiment.
Figure 7:
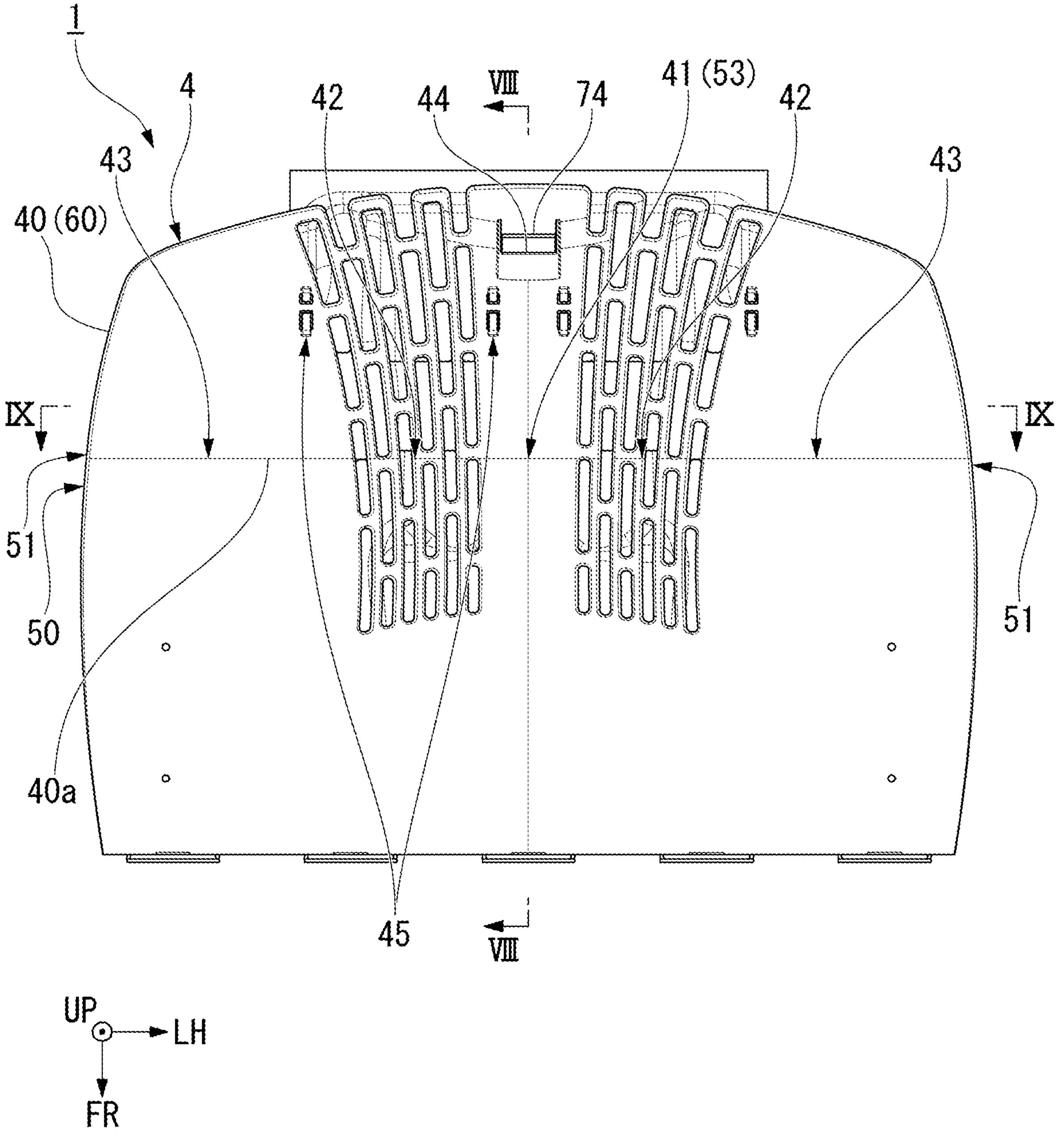
FIG. 7 is a plan view of the seat body and the seat-receiving member according to the first embodiment.
Figure 8:
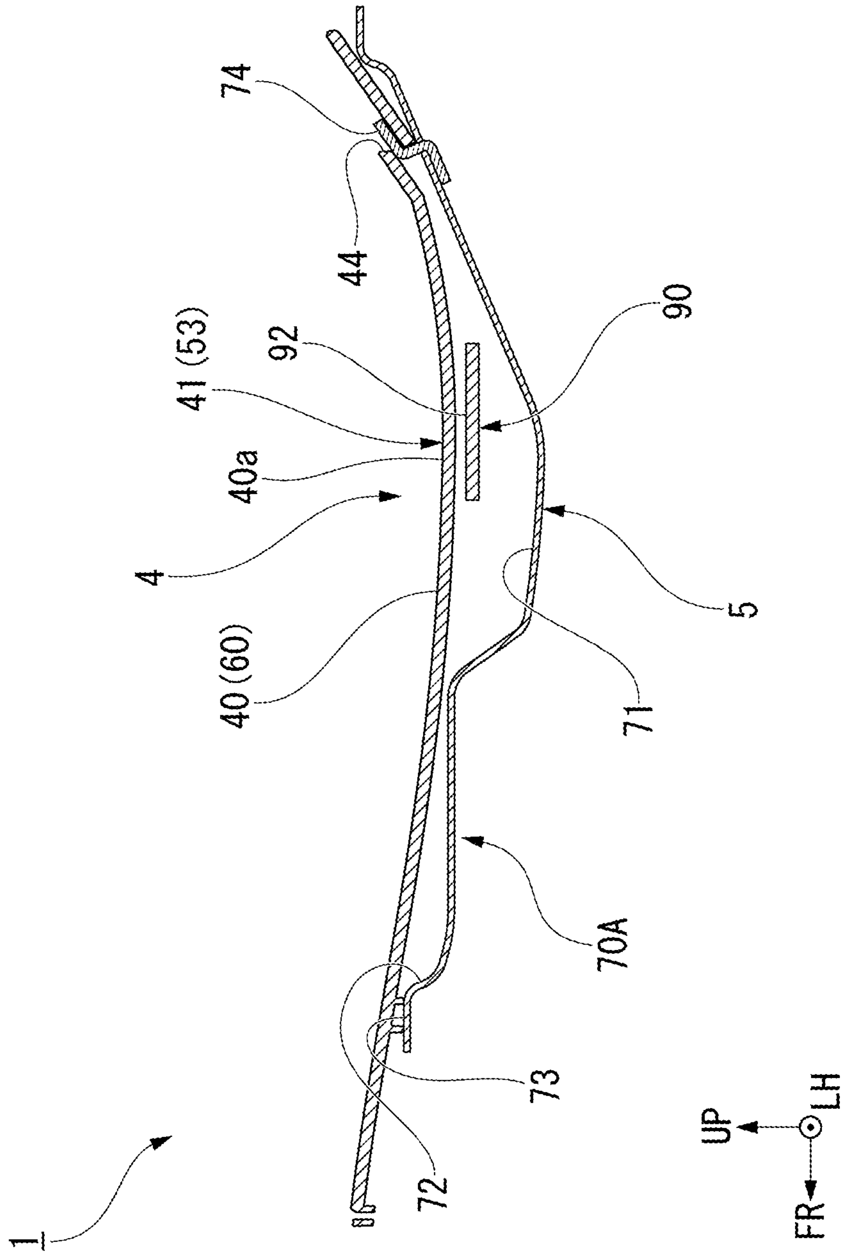
FIG. 8 is a cross-sectional view taken along line VIII-VIII in FIG. 7.
Figure 9:
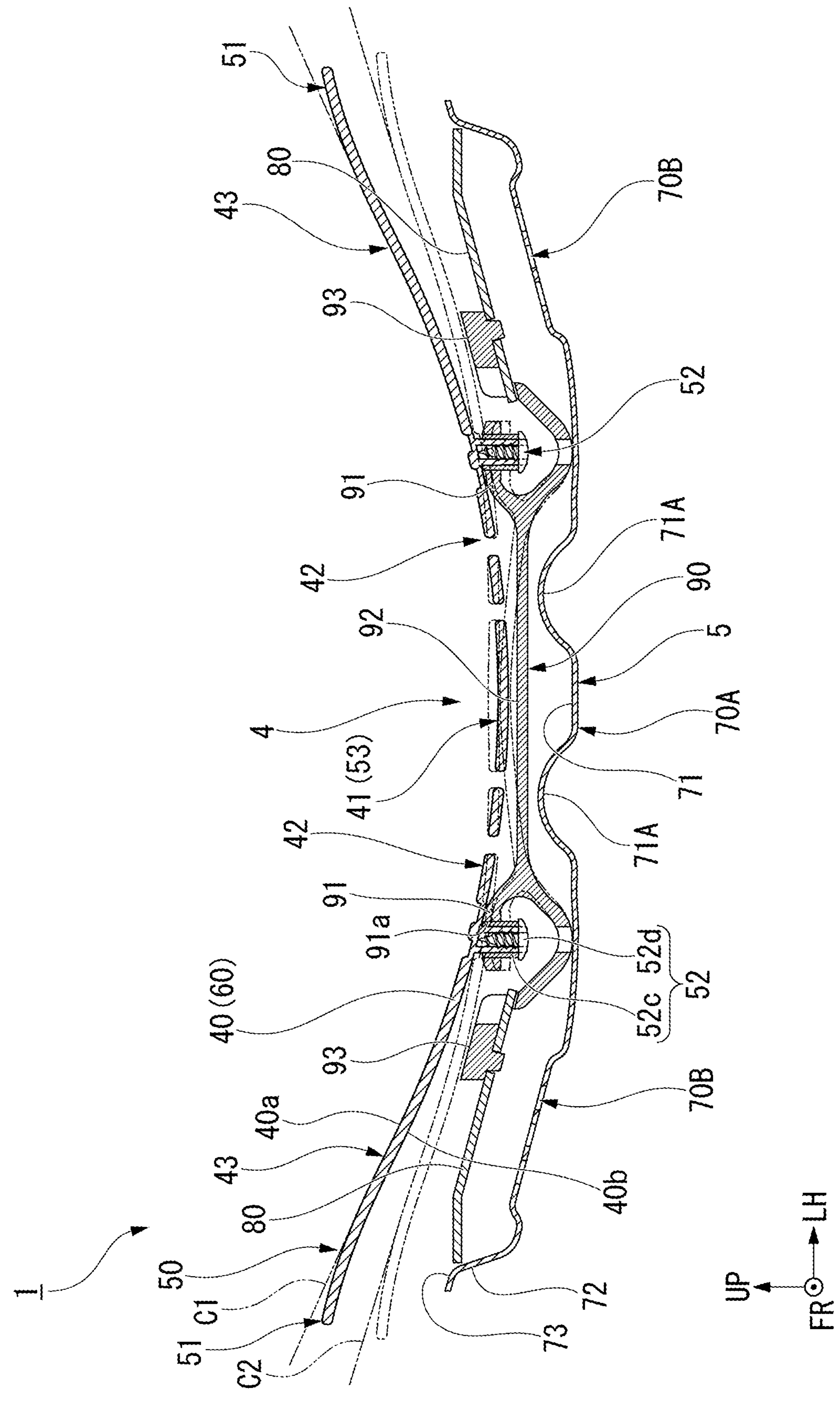
FIG. 9 is a cross-sectional view taken along line IX-IX in FIG. 7.

FIG. 5 is a perspective view of the seat body 4 and the seat-receiving member 5 according to the first embodiment. FIG. 6 is an exploded perspective view of the seat body 4 and the seat-receiving member 5 according to the first embodiment. FIG. 7 is a plan view of the seat body 4 and the seat-receiving member 5 according to the first embodiment. FIG. 8 is a cross-sectional view taken along line VIII-VIII in FIG. 7. FIG. 9 is a cross-sectional view taken along line IX-IX in FIG. 7.

As shown in FIG. 5, the seat body 4 includes the seat plate 40 (receiving surface component) that is molded with resin and forms the skeleton of the seat body 4.

The seat plate 40 has a substantially rectangular shape with rounded corners in the plan view shown in FIG. 7. The seat plate 40 includes two mesh plate portions 42 formed to be spaced apart from each other in the right-left direction with a central plate portion 41 interposed therebetween. Two mesh plate portions 42 extend from a rear end edge of the seat plate 40 to a front side of an intermediate position of the seat plate 40 in the front-rear direction. The mesh plate portion 42 is formed in a manner that rows of slits adjacent to each other in the right-left direction are shifted from each other by about half pitch in the front-rear direction while the mesh plate portion 42 is slightly curved such that the row of slits extending in the front-rear direction is recessed outward in the right-left direction. That is, the mesh plate portion 42 is formed by slits disposed in a zigzag pattern. In other words, the mesh plate portion 42 is formed by disposing slits in the zigzag pattern with respect to the seat plate 40.

The seat plate 40 includes a central plate portion 41 that forms a central portion in the right-left direction, two mesh plate portions 42 formed on both sides of the central plate portion 41 in the right-left direction, and an outer plate portion 43 formed on both sides of two mesh plate portions 42 in the right-left direction. A locking target portion 44 locked by a locking piece 74 of the seat-receiving member 5 is formed on the rear side of the central plate portion 41. In addition, a fixing piece 45 that is disposed with the mesh plate portion 42 interposed therebetween and fixes a seat skin material (not represented) is formed in the central plate portion 41 and the outer plate portion 43.

As shown in FIG. 5, the seat plate 40 having the above configuration has a receiving surface 40*a* that is curved and receives a load from the seated person. The receiving surface 40*a* has a curved shape that protrudes downward in a front view. The seat-receiving member 5 supports the seat plate 40 from the back side of the receiving surface 40*a*. As shown in FIG. 6, the seat-receiving member 5 includes a main body portion 70A having a rectangular shape in a plan view and an armrest attachment portion 70B that extends outward in the right-left direction from a side portion 70A1 of the main body portion 70A in the right-left direction. The seat-receiving member 5 is, for example, a strength member made of a drawn sheet metal or a metal material such as aluminum die-cast, and has a saucer shape (shape that is recessed upward) in which the upper side in the up-down direction is open.

Specifically, the seat-receiving member 5 includes a bottom wall portion 71 and a side wall portion 72 that stands from a peripheral edge portion of the bottom wall portion 71. An upper end portion of the side wall portion 72 is provided with a flange 73 that extends outward. The armrest 8 is externally fitted to the armrest attachment portion 70B and is attached to the armrest attachment portion 70B by screwing the armrest attachment portion 70B to the bottom wall portion 71 from the bottom. As shown in FIG. 8, the seat plate 40 is supported in a state where the rear side in the front-rear direction is locked to the locking piece 74 of the seat-receiving member 5, and the front side in the front-rear direction is supported by the flange 73 at a front end edge of the main body portion 70A of the seat-receiving member 5.

As shown in FIG. 6, a reinforcing metal fitting 80 and a spring member 90 are attached to the inside of the seat-receiving member 5. Two the reinforcing metal fittings 80 are attached to the bottom wall portions 71 of the right and left armrest attachment portions 70B. The reinforcing metal fitting 80 is formed in a box shape that covers a screwing portion of the armrest 8 at the bottom wall portion 71 of the armrest attachment portion 70B. An engagement piece 81 that engages with the spring member 90 is formed at an end edge of the reinforcing metal fitting 80 that is directed inward in the right-left direction. A positioning hole 82 for positioning the spring member 90 is formed in the upper surface of the reinforcing metal fitting 80.

The spring member 90 includes two support portions 91 spaced apart from each other in the right-left direction, a leaf spring portion 92 that connects two support portions 91 to each other, and an attachment target portion 93 that is provided on the outside of two support portions 91 in the right-left direction. Two support portions 91, the leaf spring portion 92, and the attachment target portion 93 in the present embodiment are integrally formed by resin molding. Note that some or all of two support portions 91, the leaf spring portion 92, and the attachment target portion 93 may have a structure in which separate components are combined without being integrally molded.

Two support portions 91 are spring elements formed in a C-shape in the front view, and are disposed such that a C-shaped gap is directed outward in the right-left direction. Through-holes 91*a* penetrating in the up-down direction are formed in two support portions 91. Two support portions 91 are disposed at positions where two uplifting portions 71A formed at the bottom wall portion 71 of the main body portion 70A of the seat-receiving member 5 are interposed therebetween in the right-left direction. Two uplifting portions 71A extend parallel to each other in the front-rear direction, and can increase bending stiffness of the seat-receiving member 5 while avoiding interference with a structure (adjustment mechanism or the like) in the support base 3 that supports the seat-receiving member 5.

The leaf spring portion 92 is a flat plate-shaped spring element that has a thickness in the up-down direction and is formed in a rectangular shape in a plan view, and connects two support portions 91 to each other. The attachment target portion 93 is a plate piece that is bent from a lower portion of the C-shaped gap of two support portions 91 and extends outward in the right-left direction. An engagement hole 93*a* into which the engagement piece 81 of the reinforcing metal fitting 80 is inserted is formed in the bent portion of the attachment target portion 93. A positioning pin 93*b* that is inserted into the positioning hole 82 of the reinforcing metal fitting 80 protrudes on the lower surface of the attachment target portion 93.

As shown in FIG. 9, the upper portion of the armrest attachment portion 70B is covered with the seat plate 40. A space in the up-down direction, which allows the seat body 4 to be displaced downward, is formed between the seat body 4 and the armrest attachment portion 70B. In the present embodiment, the armrest attachment portion 70B extends substantially horizontally in the right-left direction, but the seat plate 40 is curved to warp upward as the seat plate 40 is directed outward in the right-left direction.

The seat plate 40 includes a free end portion 51 on both sides in the right-left direction, which is not supported by the seat-receiving member 5, and a supported portion 52 that is supported by the spring member 90 of the seat-receiving member 5 on the inner side of the free end portion 51 in the right-left direction. The free end portion 51 and the supported portion 52 constitute the curved shape-changing portion 50 that changes a curvature radius of the receiving surface 40*a* from a curvature radius (shape C1) in an initial state to a relatively large curvature radius (shape C2), in accordance with a load received by the seat plate 40.

The free end portion 51 is formed by end portions of the seat plate 40 on both sides in the right-left direction. Two supported portions 52 are provided to correspond to two mesh plate portions 42 of the seat plate 40, and are supported by two support portions 91 of the spring member 90. The supported portion 52 is formed in a manner that the boss 52*c* formed on the back surface 40*b* of the seat plate 40 is inserted into the through-hole 91*a* on the upper side of the support portion 91, and then a washer (not represented) is externally fitted, and the tapping screw 52*d* is screwed into the boss 52*c* from the lower side of the support portion 91.

Next, the shape change of the seat body 4 having the above configuration by the load-supporting structure will be described.

When the seated person applies a load to the seat body 4, the outer free end portion 51 in the right-left direction of the seat plate 40, which is not fixed to the seat-receiving member 5, is elastically displaced rearward with the supported portion 52 on the inner side of the seat plate 40 in the right-left direction as a fulcrum, in accordance with the load. When the free end portion 51 of the seat plate 40 is elastically displaced downward, the curvature radius of the receiving surface 40*a* is changed from the curvature radius (shape C1) in the initial state to the relatively large curvature radius (shape C2).

In other words, when the seated person sits on the seat body 4, the buttocks or the like of the seated person having a relatively large transverse width of the body comes into contact with the free end portion 51, and the buttocks or the like of the seated person having a relatively small transverse width of the body comes into contact with a position on an inner side of the free end portion 51 in the right-left direction. When a load is further applied in this state, a force is applied to the free end portion 51 or the above-described position, and thus the seat plate 40 is curved such that the curvature radius of the receiving surface 40*a* increases with the supported portion 52 as the fulcrum. When the seated person further applies a load, finally, any of the free end portion 51 or the above position and the supported portion 52 come into contact with the buttocks or the like of the seated person, and the buttocks or the like of the seated person is supported within a wide range of the receiving surface 40*a*.

Specifically, the portion to be actually pressed on the free end portion 51 differs in the right-left direction depending on the physique (the width of the buttocks or thighs) of the seated person. As a result, a downward pressing amount of the free end portion 51 in the up-down direction changes. That is, since the supported portion 52 serves as a fulcrum of elastic displacement of the free end portion 51, the larger a distance from the supported portion 52 in the right-left direction to the portion, the larger the downward displacement amount in the up-down direction. Here, the free end portion 51 that has been elastically displaced downward tries to return to the initial state before the elastic displacement by a restoring force of the seat plate 40 itself. This becomes biasing means 60. The free end portion 51 tries to return to the initial state, thereby creating an offset state between the load received from the seated person and a biasing force of the biasing means 60, and it is possible to form a curved shape capable of giving a feeling of fitting to seated persons having various physiques.

That is, the seat plate 40 generates a biasing force for returning the curvature radius of the receiving surface 40*a* to the initial state. In other words, the seat plate 40 can use the restoring force when the state where the seat plate 40 receives the load of the seated person and is elastically deformed returns to the initial state, for returning the curvature radius of the receiving surface 40*a* to the initial state.

In addition, since two supported portions 52 are provided to be spaced apart from each other in the right-left direction, it is easy to individually elastically deform the regions on the outer side in the right-left direction and the inner side in the right-left direction with respect to two supported portions 52. The seat-receiving member 5 includes two support portions 91 that support two supported portions 52 and the leaf spring portion 92 that connects two support portions 91 to each other and presses between two supported portions 52 from the rear side toward the front side when the seat plate 40 receives a load.

When the seat plate 40 receives a load, the leaf spring portion 92 is bent to protrudes upward, with connection portions (both ends of the leaf spring portion 92) by using two support portions 91 as fulcrums. Here, each vertically long slit of the mesh plate portion 42 is expanded in the right-left direction, so that the elastic displacement of the central plate portion 41 has difficulty in being hindered. As a result, an inner region of two supported portions 52 (the central plate portion 41 forming the inter-support portion 53) in the right-left direction is elastically displaced toward the front side of the receiving surface 40*a* by being pressed by the leaf spring portion 92. Thus, even though the displacement amount of the free end portion 51 is small, it is possible to largely change the curved shape of the seat plate 40.

As described above, the load-supporting structure for the chair 1 according to the present embodiment includes the seat plate 40 having the curved receiving surface 40*a* that receives a load from a seated person, the seat-receiving member 5 (load supporter) that supports the seat plate 40 from the back side of the receiving surface 40*a*, the curved shape-changing portion 50 that changes the curvature radius of the receiving surface 40*a* from the curvature radius (shape C1) in the initial state to a relatively large curvature radius (shape C2) in accordance with the load received by the seat plate 40, and the biasing means 60 (seat plate 40) that returns the curvature radius of the receiving surface 40*a* to the initial state. Note that the biasing means 60 includes not only the restoring force of the seat plate 40 but also the restoring force of the spring member 90.

In other words, the load-supporting structure A for the chair 1 includes the seat plate 40 provided with the curved receiving surface 40*a* configured to receive a load from a seated person, the seat-receiving member 5 supporting the seat plate 40 from the back side of the receiving surface 40*a*, and the curved shape-changing portion 50 configured to change the curvature radius of the receiving surface 40*a* to a curvature radius greater than the curvature radius in the initial state in accordance with a load received by the seat plate 40. The seat plate 40 is configured to generate a biasing force for returning the curvature radius of the receiving surface 40*a* to that in the initial state. Further, the leaf spring portion 92 of the spring member 90 may be configured to use the restoring force thereof for returning from an elastic deformed state to an initial state, in addition to the biasing force of the seat plate 40, as the biasing force for returning the curvature radius of the receiving surface 40*a* to that in the initial state.

According to this configuration, the curvature radius of the receiving surface 40*a* of the seat plate 40 that receives a load from a seated person is set to be small in the initial state, and the curved shape is changed from being small to be large in accordance with the load received by the seat plate 40. As a result, it is possible to give a feeling of fitting to seated persons of various physiques, including seated persons having physiques from a small physique to a large physique. In addition, when the load on the seat plate 40 is released, the curvature radius of the receiving surface 40*a* can be returned to the initial state by the biasing means 60 (in other words, the restoring force of the seat plate 40). Thus, it is possible to appropriately change the curved shape of the seat plate 40 without a manual operation, in accordance with seated persons having various physiques.

In addition, in the present embodiment, the curved shape-changing portion 50 includes the free end portions 51 on both sides of the seat plate 40 in the right-left direction, the free end portions 51 being not supported by the seat-receiving member 5, and the supported portion 52 of the seat plate 40 supported by the seat-receiving member 5 on the inner side of the free end portions 51 in the right-left direction. According to this configuration, the end portions of the seat plate 40 on both sides in the right-left direction are set as the free end portions 51 that are not fixed to the seat-receiving member 5, and the free end portions 51 are displaced with the supported portion 52 as a fulcrum on the inner side of the seat plate 40 in the right-left direction, whereby the biasing means 60 biases the seat plate 40 toward the initial state. Thus, the offset state between the load received from the seated person and the biasing force of the biasing means 60 is created, and thus it is possible to form a curved shape capable of giving a feeling of fitting to the seated persons having various physiques.

In addition, in the present embodiment, the supported portion 52 includes two supported portions 52 provided to be spaced apart from each other in the right-left direction. According to this configuration, the supported portion 52 of the seat plate 40 is divided into two pieces to be spaced apart from each other in the right-left direction. Thus, it is easy to individually elastically deform the regions on the outer side in the right-left direction and the inner region in the right-left direction with respect to two supported portions 52, and thus the followability to the physique of the seated person is improved.

Further, in the present embodiment, the seat-receiving member 5 includes two support portions 91 that support the two supported portions 52, and the leaf spring portion 92 connecting the two support portions 91 to each other and configured to push a position between the two supported portions 52 from the back side toward the front side when the seat plate 40 receives a load. According to this configuration, when the outer free end portions 51 of two supported portions 52 in the right-left direction are elastically displaced toward the rear side of the receiving surface 40*a*, the inner region of two supported portions 52 in the right-left direction is elastically displaced toward the front side of the receiving surface 40*a* by pressing of the leaf spring portion. Thus, it is possible to largely change the curved shape of the seat plate 40 even though the displacement amount of the free end portion 51 is small.

In addition, in the present embodiment, the seat plate 40 forms the seat body 4. According to this configuration, the seat body 4 capable of giving the appropriate feeling of fitting to seated persons having various physiques can be obtained.

In addition, in the present embodiment, the seat plate 40 includes two mesh plate portions 42 formed to be spaced apart from each other in the right-left direction. According to this configuration, it is easy to individually elastically deform the outer region (outer plate portion 43) of two mesh plate portions 42 in the right-left direction and the inner region (central plate portion 41 forming the inter-support portion 53) in the right-left direction. Thus, the followability to the physique of the seated person is improved.

Since the chair 1 according to the present embodiment includes the load-supporting structure of the seat body 4, it is possible to give an appropriate feeling of fitting to seated persons having various physiques.

As described above, according to the present embodiment, it is possible to appropriately change the curved shape of the seat body 4 without a manual operation, in accordance with seated persons having various physiques.

Second Embodiment

Next, a second embodiment of the present invention will be described. In the following description, the same or equivalent configurations as those in the above-described embodiment are designated by the same reference signs, and descriptions thereof will be simplified or omitted.

Figure 10:
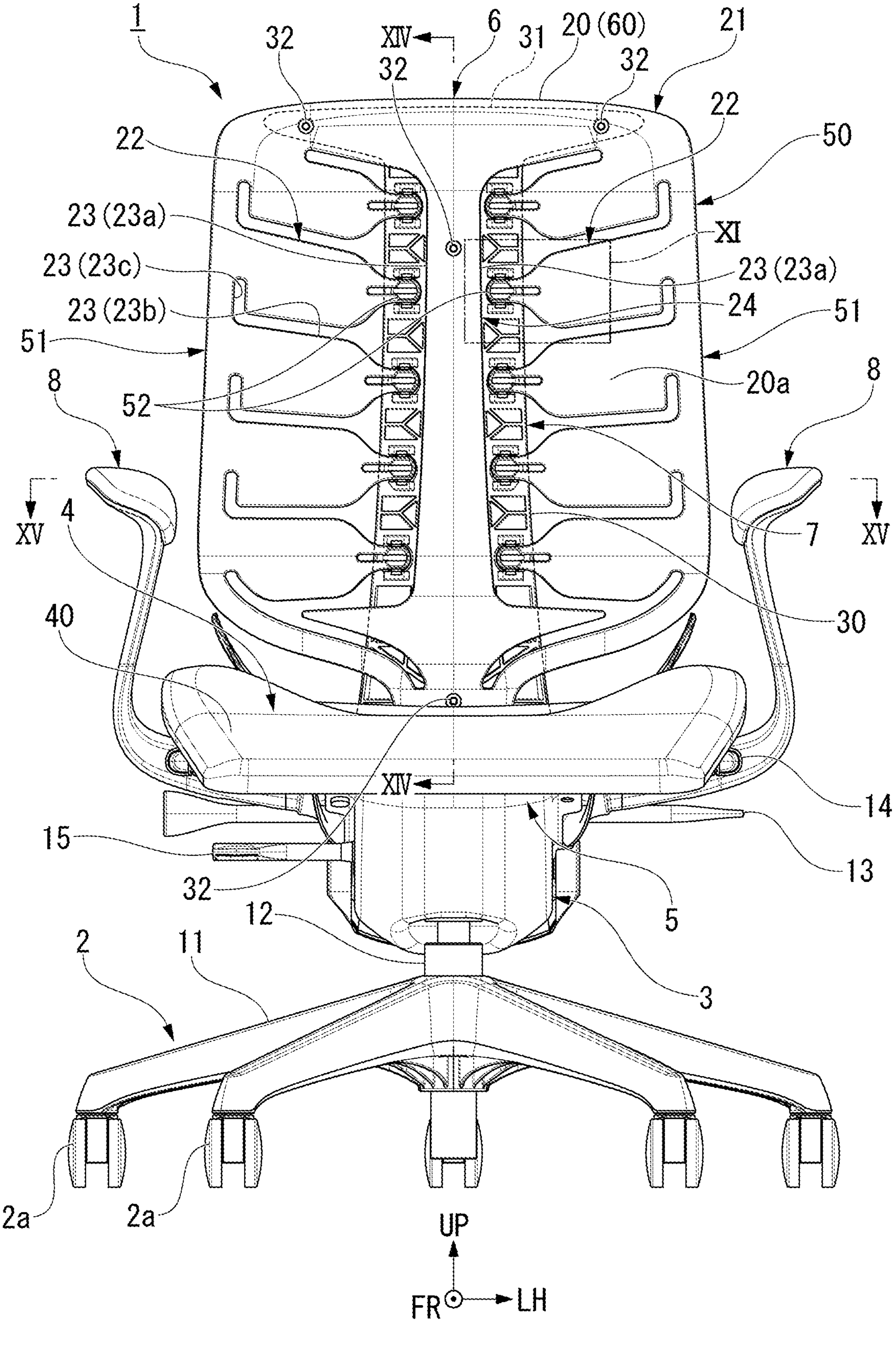
FIG. 10 is a front view of a chair according to a second embodiment.
Figure 11:
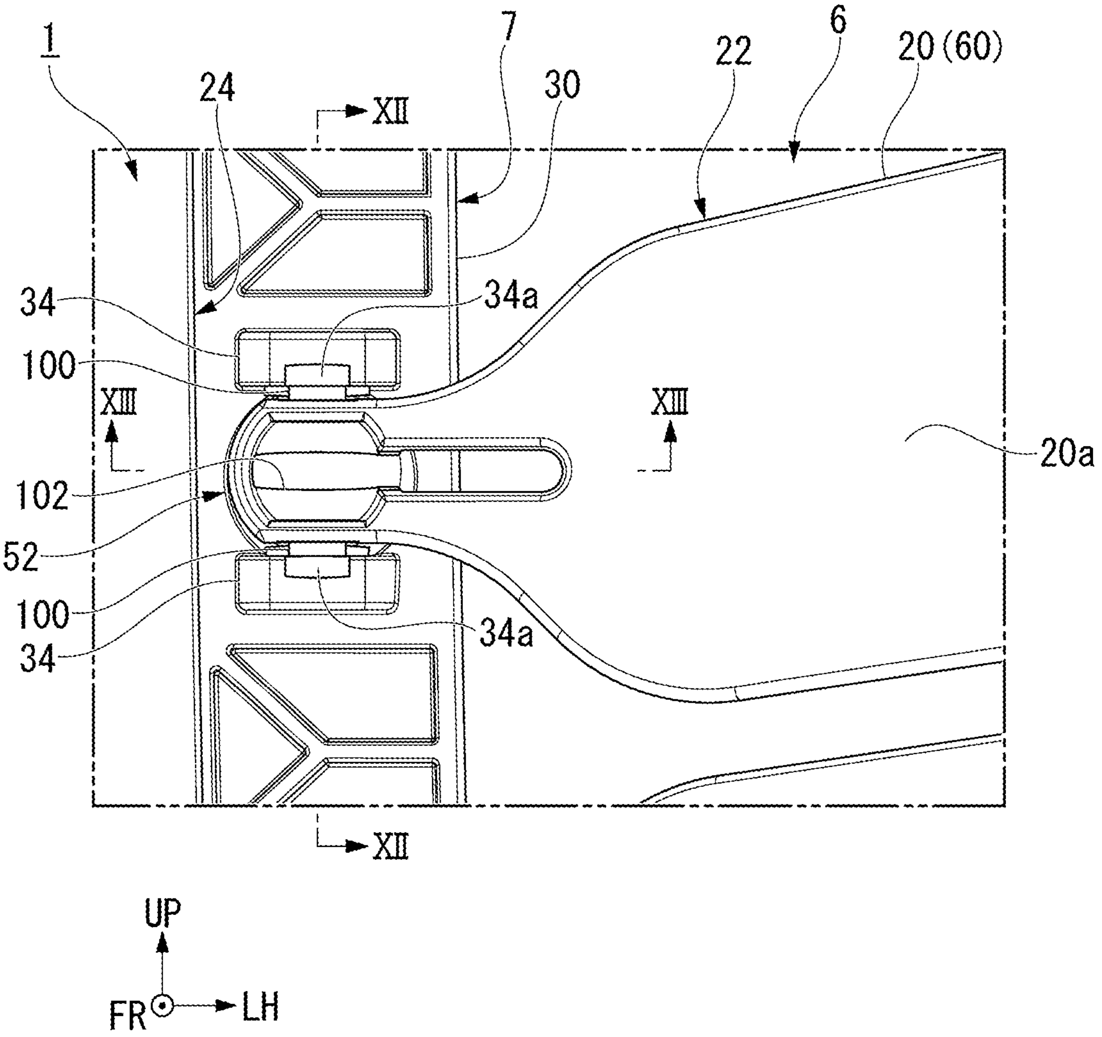
FIG. 11 is an enlarged view of a region XI shown in FIG. 10.
Figure 12:
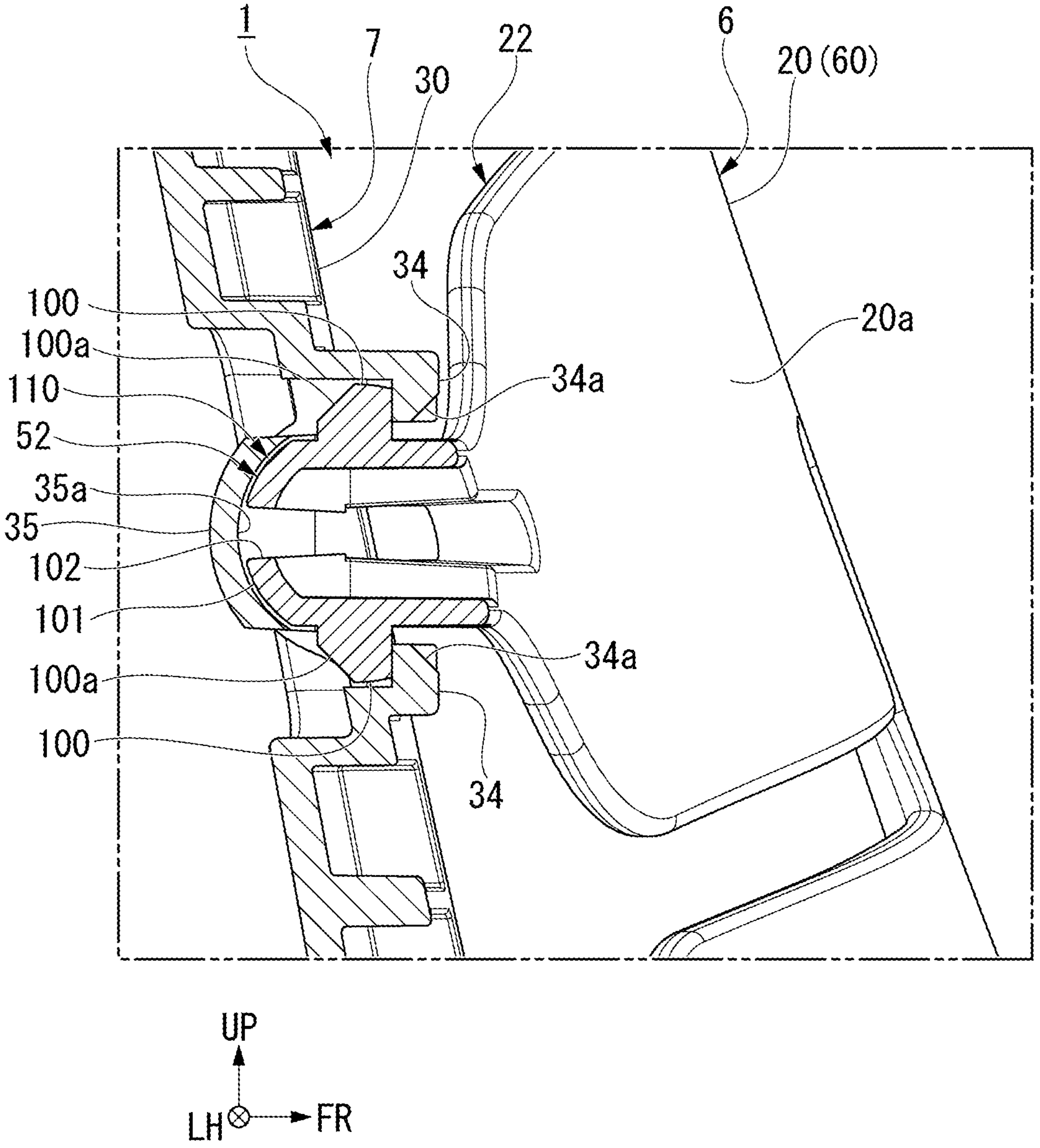
FIG. 12 is a cross-sectional view taken along line XII-XII shown in FIG. 11.
Figure 13:
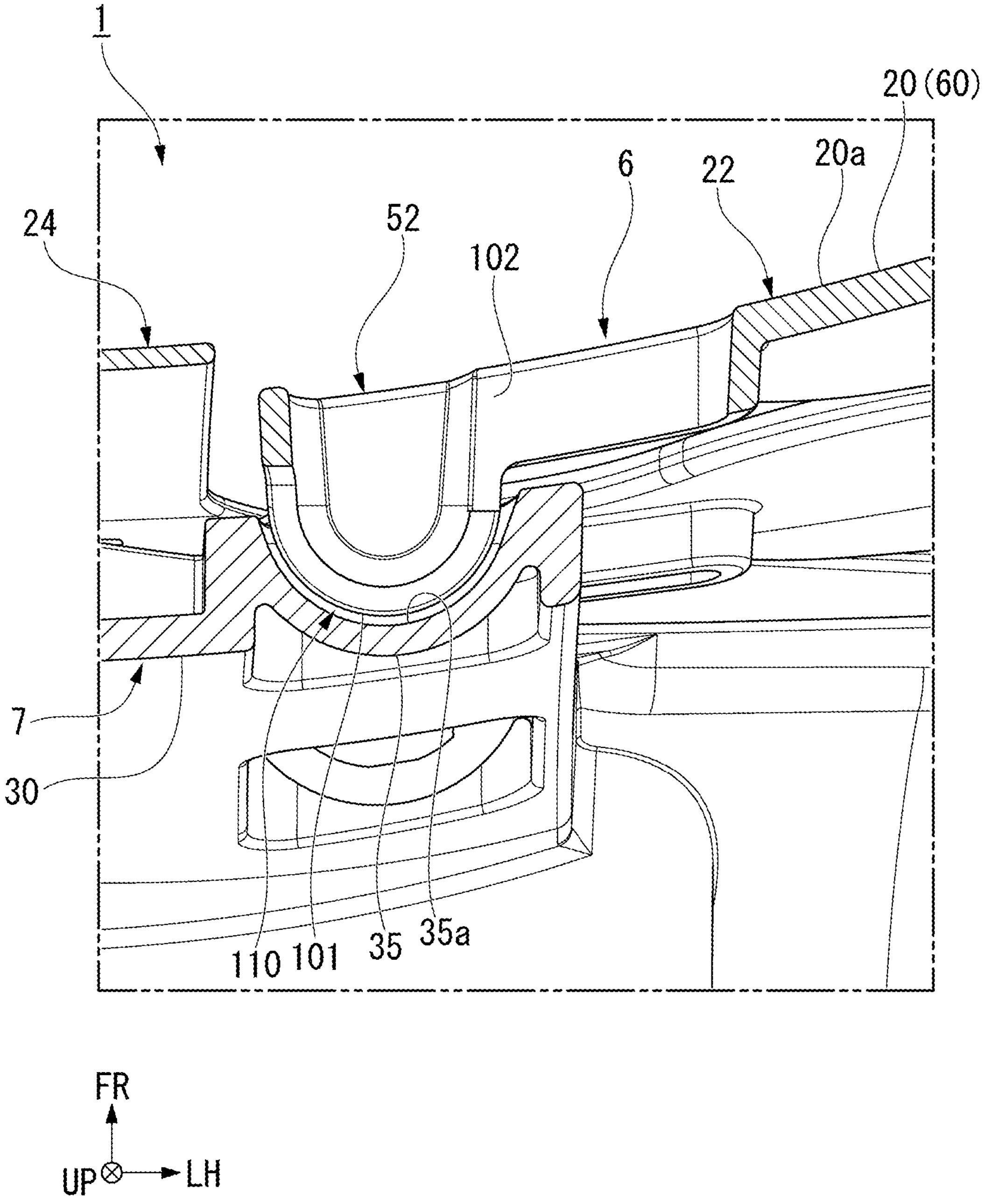
FIG. 13 is a cross-sectional view taken along line XIII-XIII shown in FIG. 11.
Figure 14:
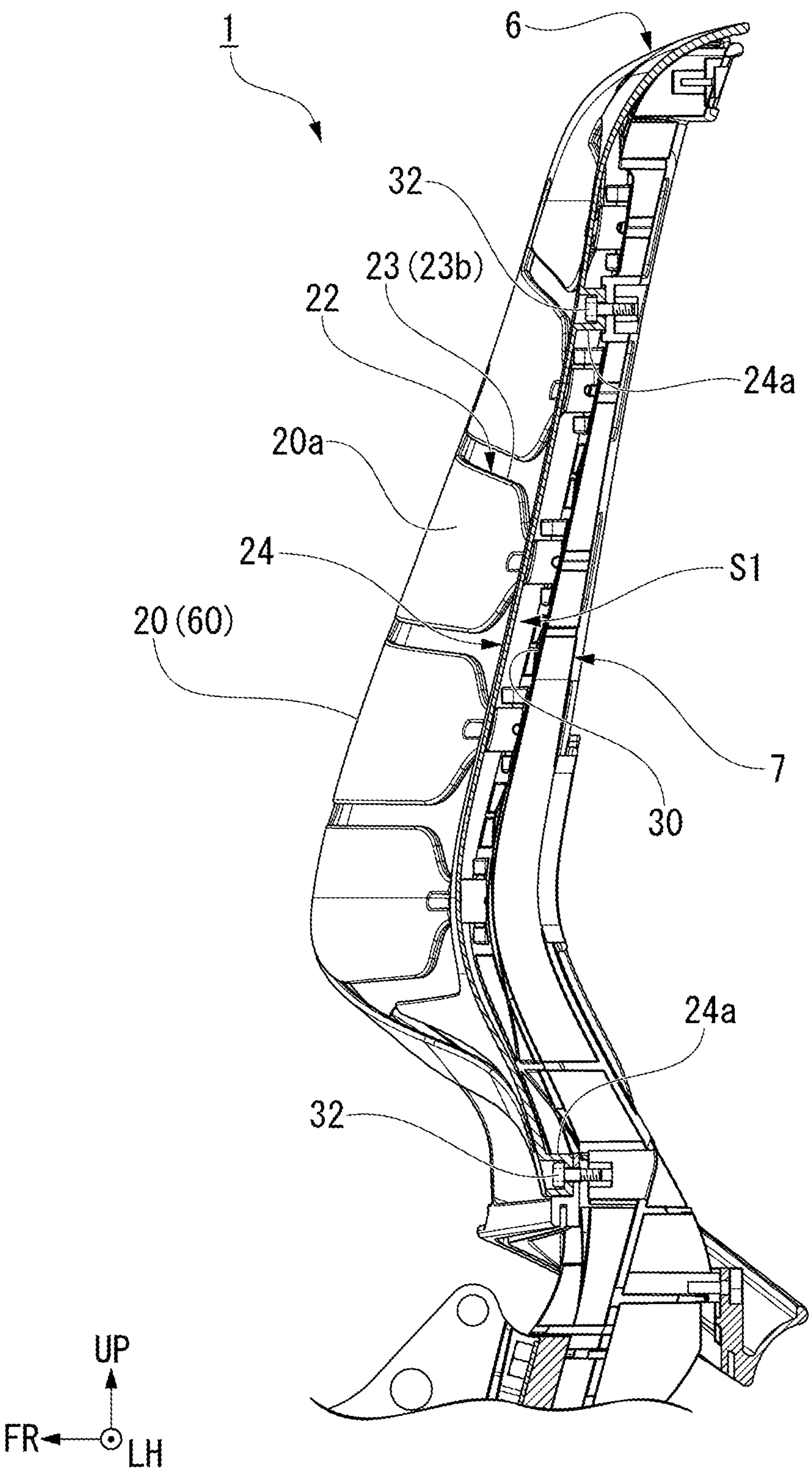
FIG. 14 is a cross-sectional view taken along line XIV-XIV shown in FIG. 10.
Figure 15:
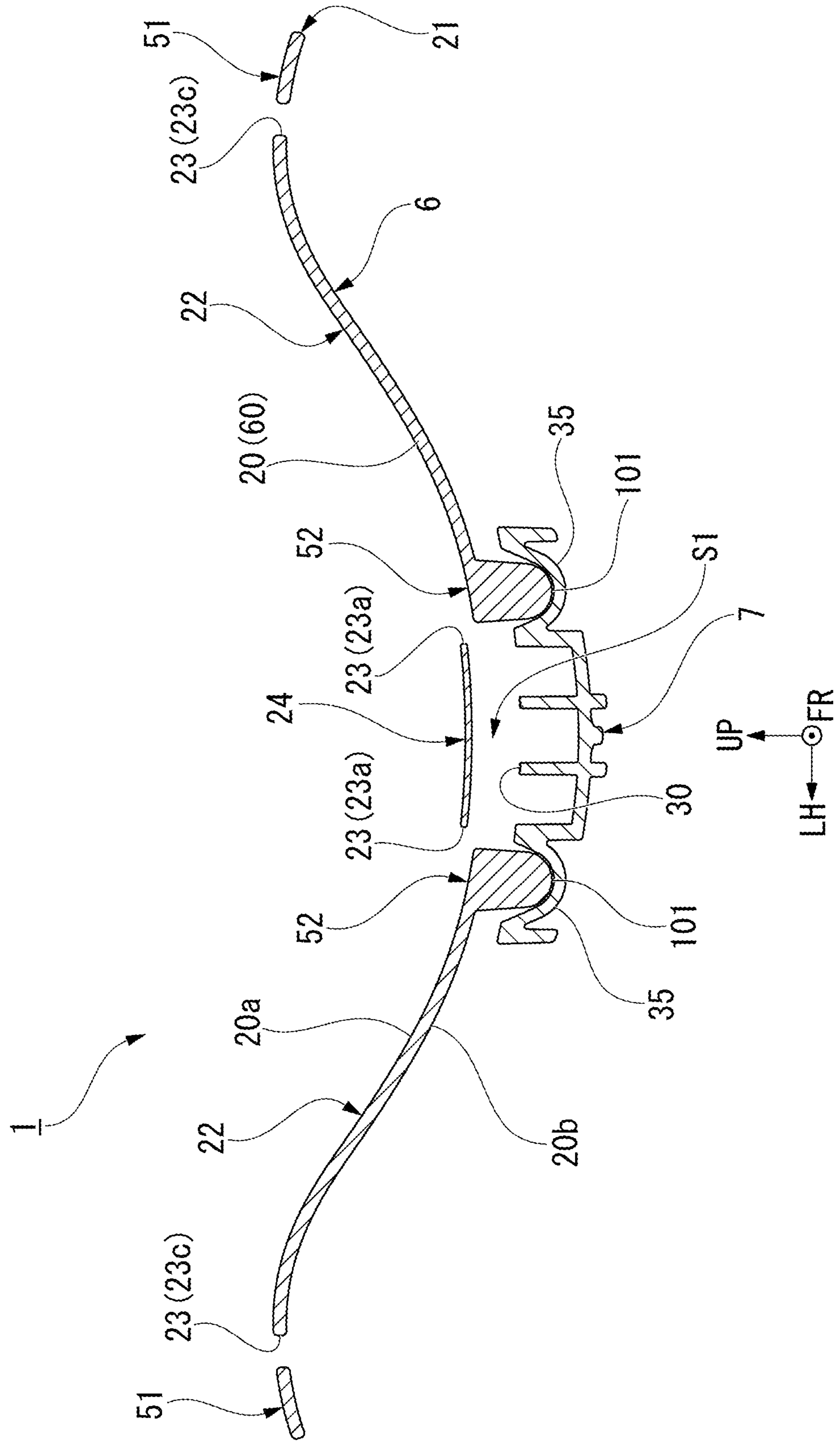
FIG. 15 is a cross-sectional view taken along line XV-XV shown in FIG. 10.

FIG. 10 is a front view of a chair according to the second embodiment. FIG. 11 is an enlarged view of a region XI shown in FIG. 10. FIG. 12 is a cross-sectional view taken along line XII-XII shown in FIG. 11. FIG. 13 is a cross-sectional view taken along line XIII-XIII shown in FIG. 11. FIG. 14 is a cross-sectional view taken along line XIV-XIV shown in FIG. 10. FIG. 15 is a cross-sectional view taken along line XV-XV shown in FIG. 10.

As shown in FIG. 10, a chair 1 according to the second embodiment differs from the above embodiment in that a supported portion 52 of a curved shape-changing portion 50 is integrally formed with a backrest plate 20.

In the second embodiment, the backrest plate 20 has a substantially rectangular shape with four rounded corners in the front view shown in FIG. 10. The backrest plate 20 includes a frame portion 21 that forms an external shape of the backrest plate 20, a plurality of strip-shaped portions 22 separated through a slit 23 inside the frame portion 21, and a columnar portion 24 disposed between right and left strip-shaped portions 22 inside the frame portion 21. The slit 23 includes a first slit 23*a*, a second slit 23*b*, and a third slit 23*c*.

The columnar portion 24 extends in the up-down direction at a central portion of the backrest plate 20 in the right-left direction. In the second embodiment, the first slit 23*a* is formed on both the left and right sides of the columnar portion 24. In the second embodiment, some of a plurality of second slits 23*b* extend outward (leftward) in the right-left direction from the first slit 23*a* on the left side of the columnar portion 24, and another some of the plurality of second slits 23*b* extend outward (rightward) in the right-left direction from the first slit 23*a* on the right side of the columnar portion 24.

In the second embodiment, the third slit 23*c* is bent in an L-shape from an outer end portion of the second slit 23*b* in the right-left direction. The width of a connection portion between the frame portion 21 and the strip-shaped portion 22 in the up-down direction is narrower than the width of the strip-shaped portion 22 in the up-down direction. Note that, in the second embodiment, the width of the strip-shaped portion 22 in the up-down direction is also narrow at an inner end portion in the right-left direction, and the supported portion 52 is integrally formed at the tapered tip end portion thereof.

A backrest-supporting member 7 includes a first support portion 30 that extends in the up-down direction and supports a central portion of the backrest plate 20 in the right-left direction, and a second support portion 31 that extends from an upper end portion of the first support portion 30 to both sides in the right-left direction, and supports an upper end portion of the backrest plate 20. The first support portion 30 fixes a lower end portion of the columnar portion 24 and two portions in the vicinity of the upper end portion of the columnar portion 24, through fixing members 32 such as bolts. In addition, the second support portion 31 fixes two right and left portions of one side extending in the right-left direction at the upper end of the frame portion 21 of the backrest plate 20 through the fixing members 32 such as bolts.

As shown in FIG. 11, the supported portion 52 of the curved shape-changing portion 50 is integrally formed with an inner end portion of the strip-shaped portion 22 in the right-left direction. The supported portion 52 includes a rotating shaft 100 that is rotatably supported by the backrest-supporting member 7 about an axis extending in the up-down direction. The backrest-supporting member 7 includes two rotation support portions 34 that rotatably support two rotating shafts 100 extending from the supported portion 52 to both sides in the up-down direction. Two rotation support portions 34 are integrally formed with the first support portion 30. That is, in the second embodiment, the ball stud 52*a*, the socket 52*b*, and the attachment plate 33 (see FIG. 3) described in the first embodiment are omitted, and the strip-shaped portion 22 is directly supported by the first support portion 30.

As shown in FIG. 12, the supported portion 52 has a U-shaped cross-sectional shape that protrudes rearward in the front-rear direction. The rotating shaft 100 protrudes from upper and lower surfaces of the supported portion 52 to both sides in the up-down direction. The rotating shaft 100 is formed in a columnar shape including an inclined surface 100*a* in which a corner of a tip end portion thereof on the rear side in the front-rear direction is obliquely dropped. The rotation support portion 34 has a hook shape that is L-shaped in sectional view and engages with the front side of the rotating shaft 100 in the front-rear direction. An inclined surface 34*a* that is slidably in contact with the inclined surface 100*a* of the rotating shaft 100 when the rotating shaft 100 is inserted is formed on a surface of the rotation support portion 34, which is directed forward in the front-rear direction.

The supported portion 52 includes a spherical portion 101 on the rear side of the rotating shaft 100 in the front-rear direction. The spherical portion 101 is separated into upper and lower portions by a slit 102. Note that the width of the slit 102 in the up-down direction may be equal to or larger than an engagement allowance (the total length of an engaging portion in the up-down direction) between the rotating shaft 100 and the rotation support portion 34. As a result, when the inclined surface 100*a* of the rotating shaft 100 is aligned with the inclined surface 34*a* of the rotation support portion 34 and the supported portion 52 is pushed rearward, the supported portion 52 is compressed and deformed in accordance with the width of the slit 102 in the up-down direction, and the rotating shaft 100 rides over the rotation support portion 34. Thereafter, the supported portion 52 is restored and deformed, so that the rotating shaft 100 engages with the back surface side (rear surface side) of the rotation support portion 34. Note that, as shown in FIG. 11, the slit 102 may be extended to the strip-shaped portion 22 in order to adjust the ease of elastic deformation of the supported portion 52.

The first support portion 30 includes a spherical receiving portion 35 that faces the spherical portion 101 at a position on the rear side in the front-rear direction, in a state where the rotating shaft 100 engages with the rotation support portion 34. As shown in FIGS. 12 and 13, the spherical receiving portion 35 has a facing surface 35*a* that faces the spherical portion 101 with a slight gap 110 interposed therebetween. As a result, the supported portion 52 (strip-shaped portion 22) can respond to not only rotation about the rotating shaft 100 extending in the up-down direction but also twisting (rotation) around an axis extending in the front-rear direction and twisting (rotation) around an axis extending in the right-left direction.

According to the load-supporting structure of the backrest 6 (load-supporting structure of chair) according to the second embodiment described above, as shown in FIG. 10, the plurality of strip-shaped portions 22 include two strip-shaped portions 22 that are separated right and left through the slit 23 (first slit 23*a*) at the central portion of the backrest plate 20 in the width direction, and the inner end portion of each of the two strip-shaped portions 22 in the width direction is supported by the backrest-supporting member 7 at the central portion of the backrest plate 20 in the width direction. According to this configuration, since two right and left strip-shaped portions 22 can be individually and elastically deformed by the separation at the central portion of the backrest plate 20 in the width direction, it is easy to change the curved shape of the receiving surface of the backrest plate 20 starting from the central portion in the width direction, and the followability to the physique of the seated person is improved.

Further, in the second embodiment, as shown in FIG. 12, the inner end portion of each of the two strip-shaped portions 22 in the width direction includes the rotating shaft 100 that is rotatably supported by the backrest-supporting member 7 on an axis extending in the up-down direction. According to this configuration, when a load is applied from the seated person to the frame portion 21 (free end portion 51) on the outer side of two left and right strip-shaped portions 22 in the width direction, each of two strip-shaped portions 22 is rotated around the rotating shaft 100 extending in the up-down direction, which is provided at the inner end portion in the width direction. Therefore, the backrest plate 20 is easily deformed forward and rearward in conjunction with the load input to the frame portion 21. In addition, since the gap 110 is slightly formed between the spherical portion 101 and the spherical receiving portion 35, it is possible to respond to twisting around the axis extending in the front-rear direction and twisting around the axis extending in the right-left direction.

In addition, in the second embodiment, as shown in FIG. 14, a space S1 that allows elastic deformation of the columnar portion 24 in the front-rear direction is formed between the columnar portion 24 of the backrest plate 20 and the first support portion 30 of the backrest-supporting member 7. Specifically, the columnar portion 24 is provided with a spacer portion 24*a* that protrudes rearward at a fixing position by a fixing member 32. The spacer portion 24*a* is formed with a bottomed cylindrical counterbored portion that accommodates a head portion of the fixing member 32 (bolt). Then, the space S1 is formed in a manner that the spacer portion 24*a* abuts on the front surface of the first support portion 30 at the two upper and lower fixing positions of the columnar portion 24.

The backrest plate 20 has a configuration in which the free end portions 51 on both sides in the right-left direction are bent in the front-rear direction, and the fixing position with the backrest-supporting member 7 is limited to the central portion in the right-left direction. However, as in the above-described first embodiment shown in FIG. 2 and the like, in a case where there is no clearance in the front-rear direction at the central portion, it is relatively easy to feel the hardness at the central portion as compared to easy bending of the free end portion 51 on both sides in the right-left direction. In the second embodiment, in order to avoid this situation, the movement (space S1) of the backrest plate 20 (the columnar portion 24) in the front-rear direction with respect to the first support portion 30 is provided between fixing positions of the fixing member 32 that fixes the columnar portion 24 at two upper and lower portions.

In addition, in the second embodiment, the columnar portion 24 is formed in a plate shape having a thickness in the front-rear direction. As a result, the columnar portion 24 is easily bent in the front-rear direction. Specifically, as shown in FIG. 10, the columnar portion 24 is a strip-shaped body extending in the up-down direction, has a width in the right-left direction, and has a thickness in the front-rear direction. In addition, the columnar portion 24 has a plate shape in both of a plan sectional view and a side sectional view.

In addition, in the second embodiment, as shown in FIG. 15, the position of the front surface of the columnar portion 24 is positioned in front of the supported portion 52 (specifically, the position of the front surface of the inner end portion of the strip-shaped portion 22 in the right-left direction). As a result, it is possible to ensure the size of the bending allowance of the columnar portion 24 in the front-rear direction, and the columnar portion 24 can abut on the seated person prior to the supported portion 52 (portion in which hardness is likely to be felt). Note that, although a step occurs between the columnar portion 24 and the strip-shaped portion 22 in the front-rear direction, as shown in FIG. 1, in a case where the cushioning material and the seat skin material that cover the backrest plate 20 are attached, the seated person does not largely feel the step.

Hitherto, preferred embodiments of the present invention have been described with reference to the drawings. However, the present invention is not limited to the above-described embodiments. The various shapes and combinations of each configuration members represented in the above-described embodiment are merely examples, and can be changed in various ways, based on design requirements within the scope not departing from the concept of the present invention.

For example, the spring member 90 described in the load-supporting structure of the seat body 4 may be applied to the load-supporting structure of the backrest 6. That is, the spring member 90 (leaf spring portion 92) may be provided as the curved shape-changing portion 50 of the backrest 6, in addition to the free end portion 51 and the supported portion 52, and the spring member 90 (support portion 91) may be provided as the biasing means 60 of the backrest 6, in addition to the backrest plate 20. In addition, for example, the load-supporting structure of the seat body 4 may include no spring member 90, the curved shape-changing portion 50 of the seat body 4 may include the free end portion 51 and the supported portion 52, and the biasing means 60 of the seat body 4 may include the seat plate 40.

In the above embodiments, the structure in which the load-supporting structure for the chair is applied to the seat body 4 and the backrest 6 has been described. However, the load-supporting structure for the chair in the present application may be applied to a structure that supports the legs of a seated person, such as an ottoman of a chair.

The invention claimed is:

1. A load-supporting structure for a chair, comprising:

a receiving surface component provided with a curved receiving surface configured to receive a load from a seated person;

a load supporter supporting the receiving surface component from a back side of the receiving surface; and a curved shape-changing portion configured to change a curvature radius of the receiving surface from a curvature radius in an initial state thereof to a greater curvature radius than that in the initial state in accordance with a load received by the receiving surface component, wherein the receiving surface component generates a biasing force for returning the curvature radius of the receiving surface to that in the initial state, the receiving surface component forms a backrest plate including a frame portion forming an external shape of the backrest plate, and a plurality of strip-shaped portions separated through a slit inside the frame portion, wherein the slit includes a first slit extending in an up-down direction at a central portion of the backrest plate in a width direction and a plurality of second slits formed to extend from the first slit toward both left and right sides at intervals in the up-down direction to separate the strip-shaped portions into upper and lower strip-shaped portions, wherein the plurality of strip-shaped portions include two strip-shaped portions that are separated right and left through the slit at a central portion of the backrest plate in a width direction, wherein in the up-down direction inside the frame portion, a plurality of pairs of right and left strip-shaped portions are formed, and an inner end portion of each of the two strip-shaped portions in the width direction is supported by the load supporter at the central portion of the backrest plate in the width direction.

2. The load-supporting structure for a chair according to claim 1, wherein the curved shape-changing portion is configured of free end portions on both sides of the receiving surface component in a width direction, the free end portions being not supported by the load supporter, and a supported portion of the receiving surface component supported by the load supporter on an inner side of the free end portions in the width direction.

3. The load-supporting structure for a chair according to claim 2, wherein the supported portion includes two supported portions provided to be spaced apart from each other in the width direction.

4. The load-supporting structure for a chair according to claim 3, wherein the load supporter includes two support portions supporting the two supported portions, and leaf spring portion connecting the two support portions and configured to push a position between the two supported portions from the load supporter side to the receiving surface component side in accordance with the load received by the receiving surface component.

5. The load-supporting structure for a chair according to claim 4, wherein the leaf spring portion uses a restoring force thereof for returning from an elastic deformed state when the receiving surface component receives a load to an initial state, in addition to the biasing force of the receiving surface component, as a biasing force for returning the curvature radius of the receiving surface to that in the initial state.

6. The load-supporting structure for a chair according to claim 1, wherein the inner end portion of each of the two strip-shaped portions in the width direction includes a rotating shaft that is rotatably supported by the load supporter on an axis extending in an up-down direction.

7. The load-supporting structure for a chair according to claim 1, wherein the receiving surface component forms a seat plate.

8. The load-supporting structure for a chair according to claim 7, wherein the seat plate includes two mesh plate portions formed to be spaced apart from each other in a width direction.

9. A chair comprising:

the load-supporting structure for a chair according to claim 1.

* * * * *